United States Patent
Yang

(10) Patent No.: US 10,103,427 B1
(45) Date of Patent: *Oct. 16, 2018

(54) ANTENNA SYSTEM FOR A LARGE APPLIANCE

(71) Applicant: Airgain Incorporated, San Diego, CA (US)

(72) Inventor: Simon Yang, Carlsbad, CA (US)

(73) Assignee: Airgain Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/904,332

(22) Filed: Feb. 24, 2018

Related U.S. Application Data

(62) Division of application No. 15/482,790, filed on Apr. 9, 2017, now Pat. No. 9,912,043.

(60) Provisional application No. 62/441,221, filed on Dec. 31, 2016.

(51) Int. Cl.

| | |
|---|---|
| H01Q 1/24 | (2006.01) |
| H01Q 21/00 | (2006.01) |
| H01Q 5/30 | (2015.01) |
| H04W 84/12 | (2009.01) |
| H01Q 1/12 | (2006.01) |
| H04N 5/64 | (2006.01) |
| H04N 5/44 | (2011.01) |
| H04B 7/0413 | (2017.01) |

(52) U.S. Cl.
CPC .............. *H01Q 1/246* (2013.01); *H01Q 1/12* (2013.01); *H01Q 5/30* (2015.01); *H01Q 21/00* (2013.01); *H01Q 21/0043* (2013.01); *H04W 84/12* (2013.01); *H04B 7/0413* (2013.01); *H04N 5/44* (2013.01); *H04N 5/64* (2013.01)

(58) Field of Classification Search
CPC ............ H01Q 5/30; H01Q 1/12; H01Q 21/00; H01Q 21/0043; H04W 84/12
See application file for complete search history.

(56) References Cited

U.S. PATENT DOCUMENTS

| | | | | |
|---|---|---|---|---|
| 9,496,932 | B1* | 11/2016 | Prendergast | ......... H04B 7/0417 |
| 9,912,043 | B1* | 3/2018 | Yang | ...................... H01Q 1/246 |
| 2007/0182643 | A1* | 8/2007 | Li | ........................ H01Q 1/2291 |
| | | | | 343/702 |
| 2009/0207082 | A1* | 8/2009 | Raghuraman | .......... H01Q 1/242 |
| | | | | 343/702 |
| 2009/0237321 | A1* | 9/2009 | Lin | ........................ H01Q 1/246 |
| | | | | 343/893 |
| 2009/0256777 | A1* | 10/2009 | Nagai | .................. H01Q 9/0407 |
| | | | | 343/893 |
| 2011/0007225 | A1* | 1/2011 | Kitaguchi | ................ H04N 5/64 |
| | | | | 348/731 |
| 2014/0375513 | A1* | 12/2014 | Kang | ..................... H01Q 1/526 |
| | | | | 343/720 |

(Continued)

*Primary Examiner* — Dieu H Duong
(74) *Attorney, Agent, or Firm* — Clause Eight IPS; Michael Catania

(57) ABSTRACT

An antenna system for a large appliance is disclosed herein. The antenna system comprises a large appliance having a front surface and a rear surface, a first antenna mounted on the rear surface, a second antenna mounted on the rear surface, a combiner in communication with the first antenna and the second antenna, a radio, a processor, and a wireless access point. The combiner selects the strongest signal of the first antenna and the second antenna to receive a wireless signal from the wireless access point.

6 Claims, 54 Drawing Sheets

(56) References Cited

U.S. PATENT DOCUMENTS

2016/0049736 A1\* 2/2016 Liu ........................ H01Q 21/28
343/893

\* cited by examiner

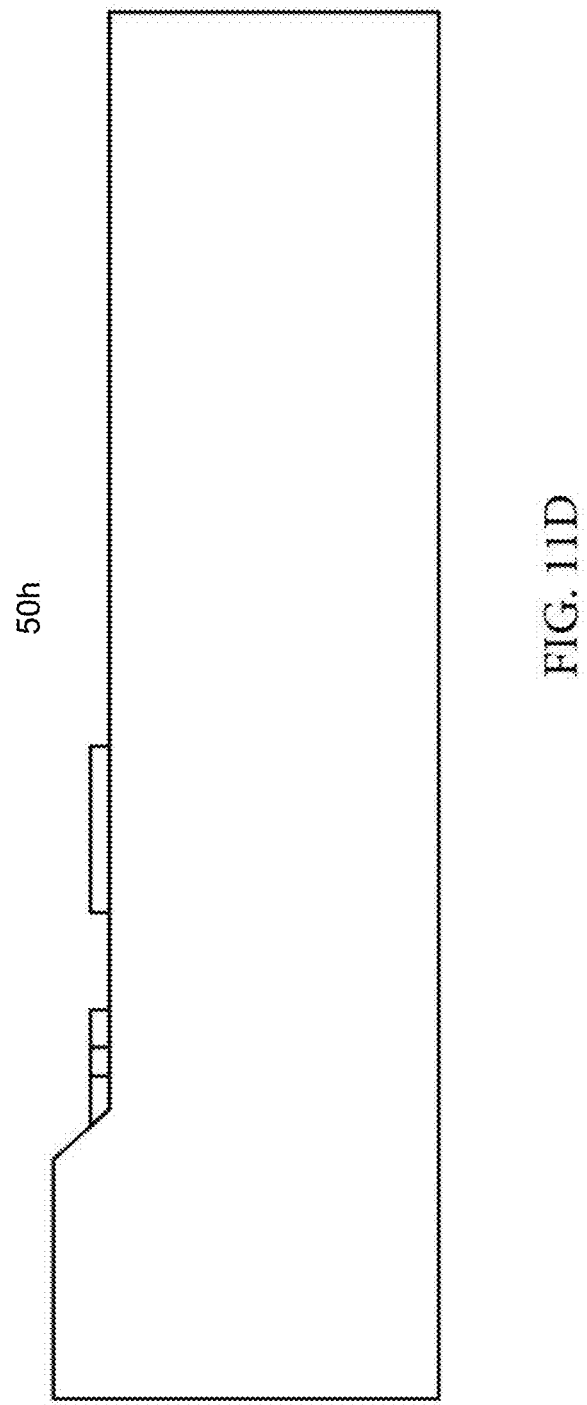

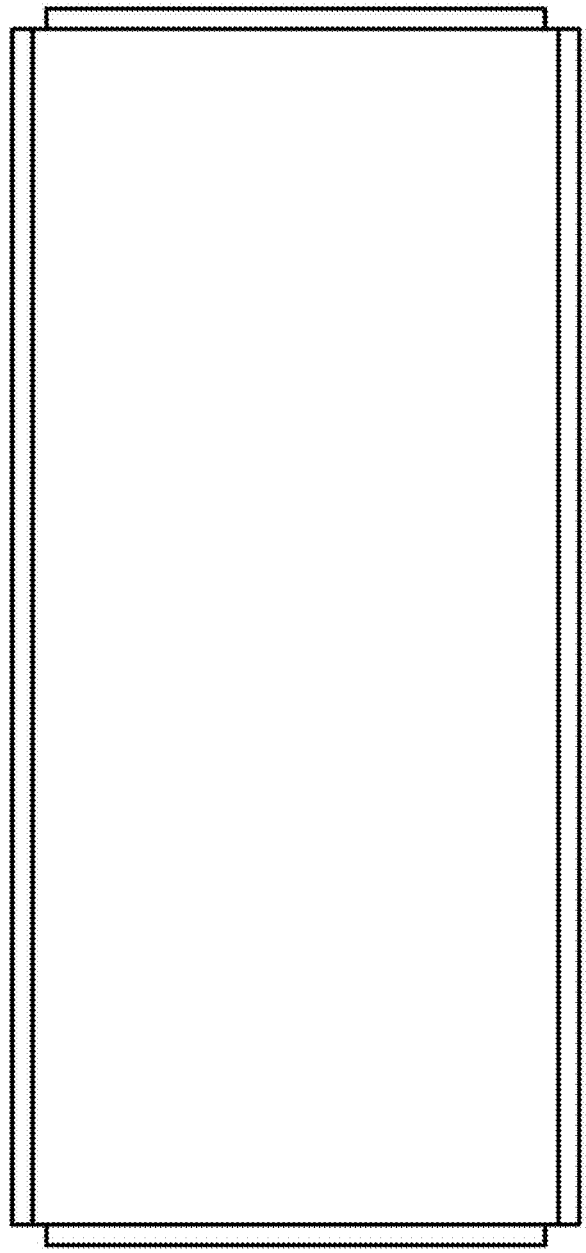

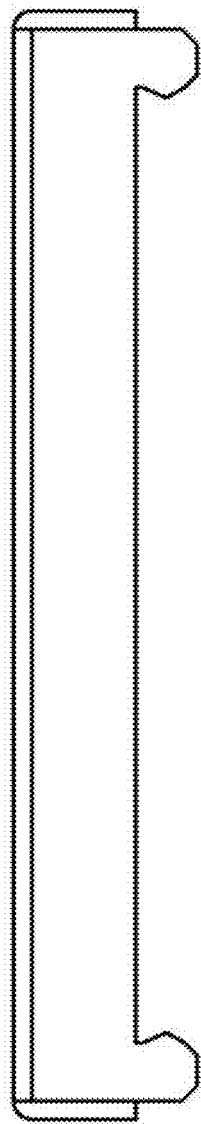

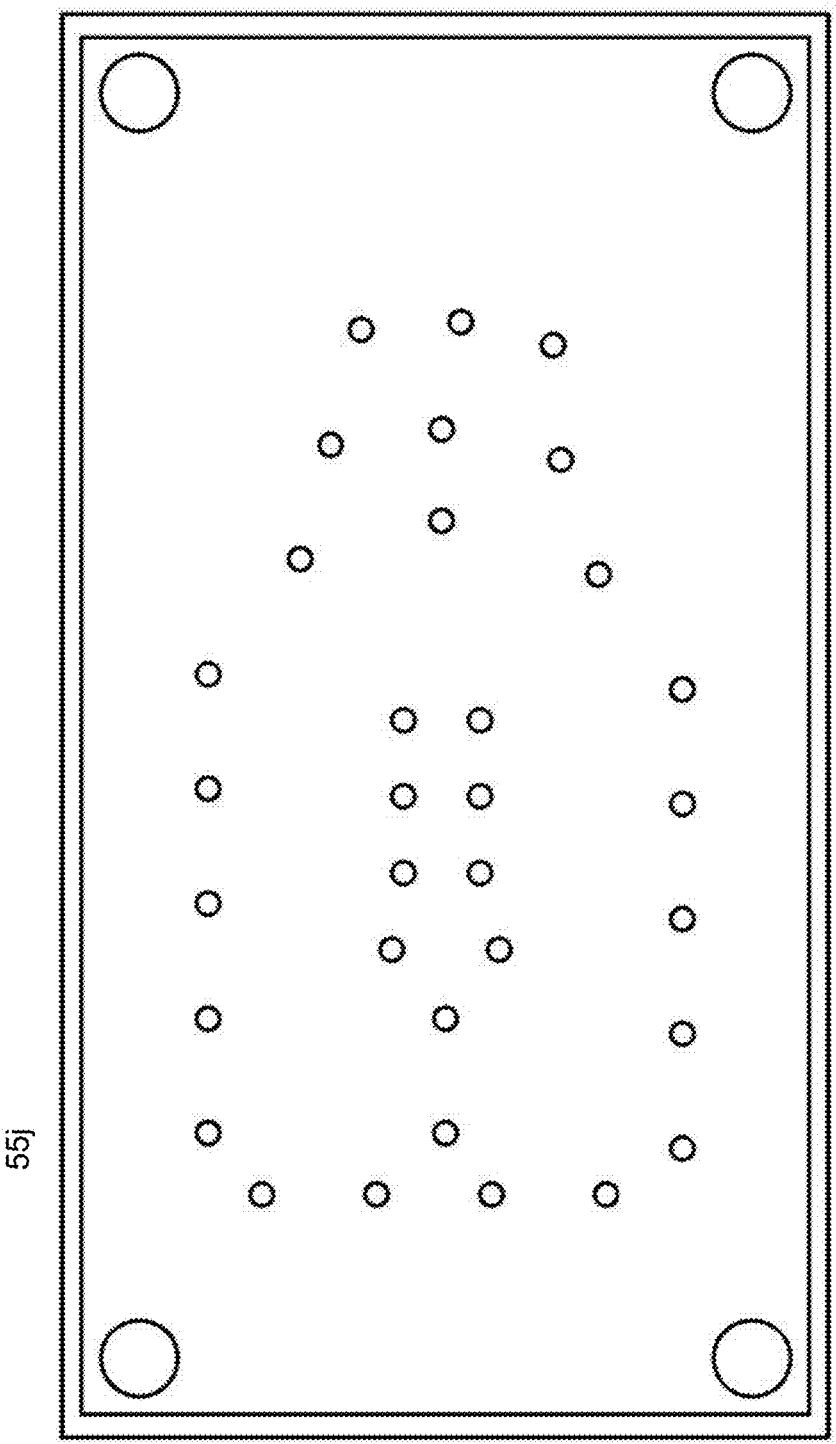

ANTENNA SYSTEM FOR A LARGE APPLIANCE

CROSS REFERENCES TO RELATED APPLICATIONS

The Present Application is a divisional application of U.S. patent application Ser. No. 15/482,790, filed on Apr. 9, 2017, which claims priority to U.S. Provisional Patent Application No. 62/441,221, filed on Dec. 31, 2016, each of which is hereby incorporated by reference in its entirety.

STATEMENT REGARDING FEDERALLY SPONSORED RESEARCH OR DEVELOPMENT

Not Applicable

BACKGROUND OF THE INVENTION

Field of the Invention

The present invention generally relates to antennas.

Description of the Related Art

The prior art discusses various antennas.

General definitions for terms utilized in the pertinent art are set forth below.

BLUETOOTH technology is a standard short range radio link that operates in the unlicensed 2.4 gigahertz band.

Antenna impedance and the quality of the impedance match are most commonly characterized by either return loss or Voltage Standing Wave Ratio.

Surface Mount Technology ("SMT") is a process for manufacturing electronic circuits wherein the components are mounted or placed directly onto a surface of a printed circuit board ("PCB").

For wireless communication devices applications, large appliances such as a large television obstruct the signal from a wireless router or wireless access point. This is a particular problem with 4K HD televisions.

BRIEF SUMMARY OF THE INVENTION

One aspect of the present invention is an antenna system for a large appliance having at least two antennas, a combiner, a radio and a processor.

Another aspect of the present invention is an antenna system for a large television having at least two antennas, a combiner, a radio and a processor.

Yet another aspect of the present invention is an antenna system for a large appliance. The antenna system comprises a large appliance having a front surface and a rear surface, a first antenna mounted on the rear surface, a second antenna mounted on the rear surface, a combiner in communication with the first antenna and the second antenna, a radio, and a processor. The combiner selects the strongest signal of the first antenna and the second antenna to receive a wireless signal from a source.

Yet another aspect of the present invention is an antenna system for a large appliance. The antenna system comprises a large appliance having a front surface and a rear surface, a PCB having a first antenna and a second antenna, a radio, and a processor. The strongest signal of the first antenna and the second antenna is selected to receive a wireless signal.

Yet another aspect of the present invention is an antenna system for a large screen television. The antenna system comprises a large television having a display surface and a rear surface, a first antenna mounted on the rear surface, a second antenna mounted on the rear surface, a combiner in communication with the first antenna and the second antenna, a radio, and a processor. The combiner selects the strongest signal of the first antenna and the second antenna to receive a wireless signal.

Having briefly described the present invention, the above and further objects, features and advantages thereof will be recognized by those skilled in the pertinent art from the following detailed description of the invention when taken in conjunction with the accompanying drawings.

BRIEF DESCRIPTION OF THE SEVERAL VIEWS OF THE DRAWINGS

FIG. 11D is a bottom plan view of the antenna of FIG. 11.

FIG. 12A is a top plan view of the shield case of FIG. 12.

FIG. 12C is a front elevation view of the shield case of FIG. 12.

FIG. 13C is a bottom plan view of the combiner of FIG. 13.

DETAILED DESCRIPTION OF THE INVENTION

In one preferred embodiment, a large television has an antenna system mounted thereto for better throughput.

The antenna system is preferably in an indoor environment.

Figure 4:
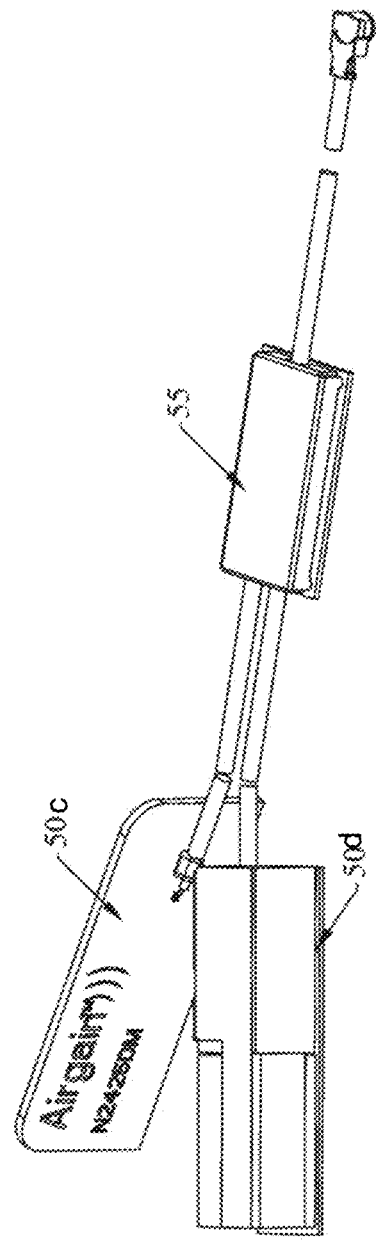
FIG. 4 is an isolated view of the antenna components of the antenna system.

As shown in FIG. 4, combiner 55 takes the stronger of the two wireless signals from the antennas 50 and the signal strength is usually 6-10 dB in difference.

The combiner 55 is preferably a passive switch that accepts the strongest wireless signal.

The uplink is preferably a wireless access point to a television.

The downlink is preferably the television to the wireless access point.

A preferred first antenna operates at 5.15 GHz and a preferred second antenna operates at 5.85 GHz.

Other frequencies for the antennas include 5150 MHz, 5200 MHz, 5300 MHz, 5400 MHz, 5500 MHz, 5600 MHz, 5700 MHz, and 5850 MHz.

Another antenna frequency is 2.4 GHz.

The antenna system preferably has dynamic spatial and polarity selection to optimize MIMO multi-clusters.

The antenna system preferably has gain throughput improvement which depends on bandwidth. The antenna system has a better benefit for very wide bandwidth, for example a 160 MHz or more channel; the antenna system optimizes all subcarriers, which a switched antenna cannot accomplish.

Figure 1:
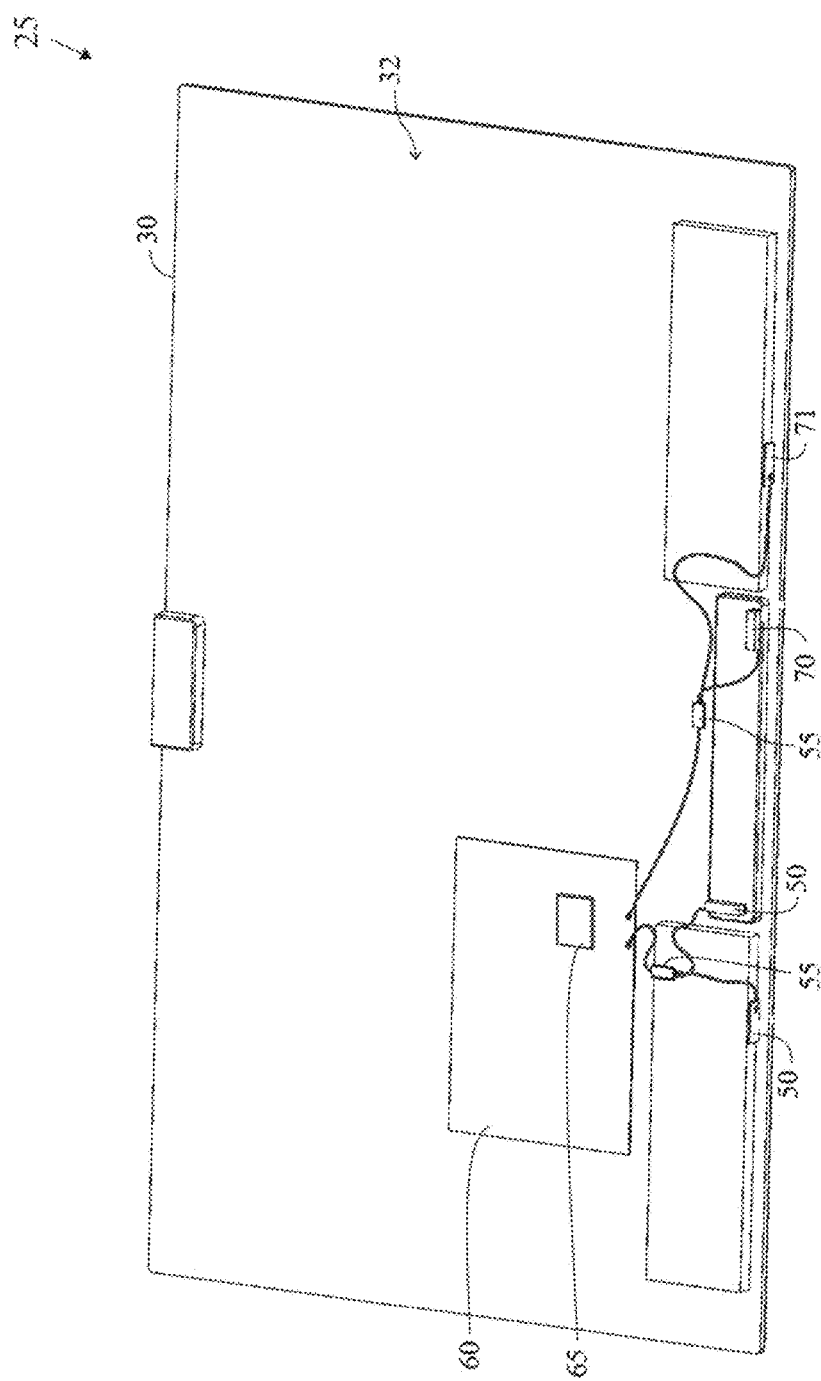
FIG. 1 is an illustration of an antenna system for a large object.
Figure 2:
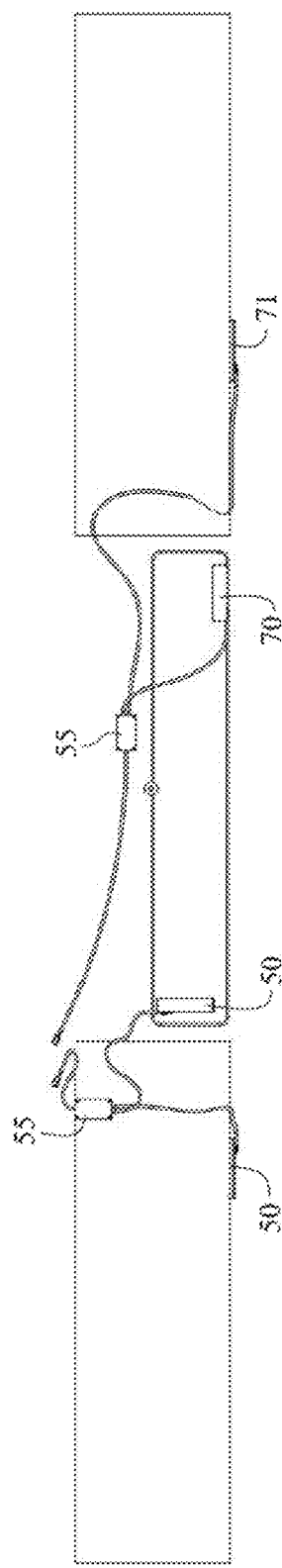
FIG. 2 is a bottom plan view of the system of FIG. 1.
Figure 3:
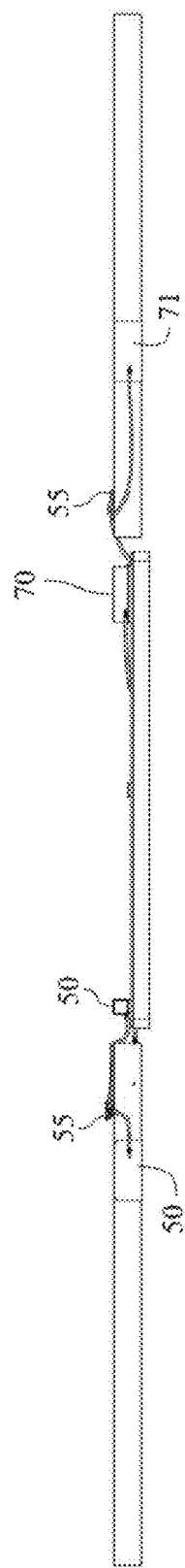
FIG. 3 is a top plan view of the system of FIG. 1.

One embodiment, shown in FIGS. 1-3, is an antenna system 25 for a large appliance 30. The antenna system 25 comprises a large appliance 30 having a front surface 31 and a rear surface 32. A first antenna 50 is mounted on the rear surface 32. A second antenna 50 is also mounted on the rear surface 32, a predetermined distance from the first antenna 50. A combiner 55 is in communication with the first antenna 50 and the second antenna 50. The antenna system 25 also includes a radio 60 and a processor 65. The combiner 55 selects the strongest signal of the first antenna 50 and the second antenna 50 to receive a wireless signal from a source.

The large appliance is preferably a refrigerator, a washing machine, a television, or a dishwasher. The large appliance preferably has a surface area of at least nine square feet. The large appliance preferably has a metal surface that blocks antenna signals from a wireless access point. The large appliance preferably has a surface area of at least two times the wavelength of the antenna signal. The large appliance alternatively has a surface area of at least five times the wavelength of the antenna signal.

The antenna system 25 further comprises a wireless access point that transmits wireless signals. The wireless access point is preferably a wireless router. The wireless access point is preferably the source.

The antenna system 25 preferably operates on an 802.11 communication protocol. Most preferably, the antenna system operates on an 802.11n communication protocol. Alternatively, the antenna system operates on an 802.11b communication protocol. Alternatively, the antenna system operates on an 802.11g communication protocol. Alternatively, the antenna system 25 operates on an 802.11a communication protocol. Alternatively, the antenna system 25 operates on an 802.11ac communication protocol.

Preferably, the first antenna operates at 2.4 GHz and the second antenna operates at 5 GHz. Alternatively, the first antenna 50 operates at 2.4 GHz and the second antenna 50 operates at 2.4 GHz. Alternatively, the first antenna 50 operates at 5 GHz and the second antenna 50 operates at 5 GHz. Alternatively, the first antenna 50 operates at 5 GHz and the second antenna 50 operates at 2.4 GHz.

The antenna system 25 is preferably a MIMO antenna system. The antenna system 25 is most preferably a MIMO antenna system with a 2×2 dual band antenna and one BLUETOOTH antenna 71 and one remote antenna 70. Alternatively, the antenna system 25 is a MIMO antenna system with a 3×3 antenna on 802.11ac and 3×3 antenna on 802.11n.

The antenna system 25 preferably further comprises a third antenna 70 and a fourth antenna 71.

FIG. 4 illustrates the antenna 50c as the first antenna, antenna 50d as the second antenna, and a combiner 55.

Figure 5:
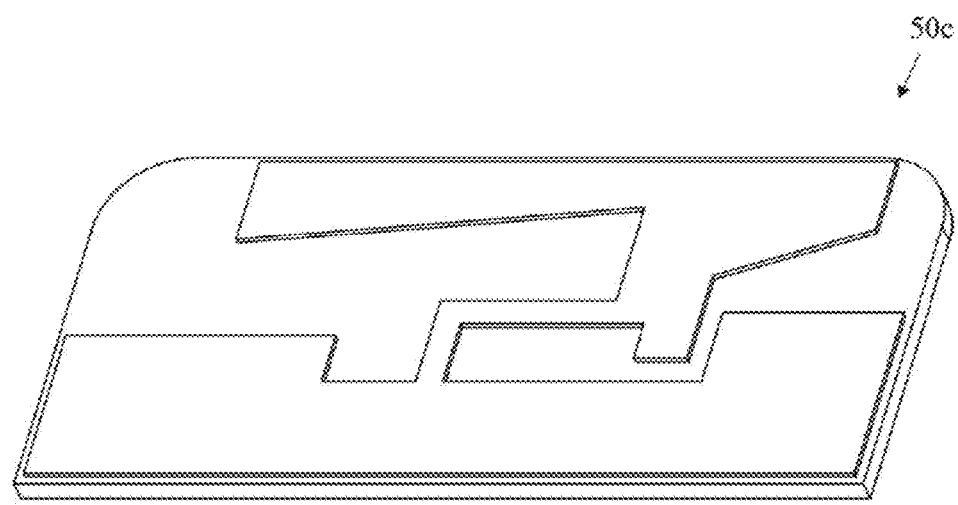
FIG. 5 is a top perspective view of the antenna of item 1 of FIG. 4.
Figure 5A:
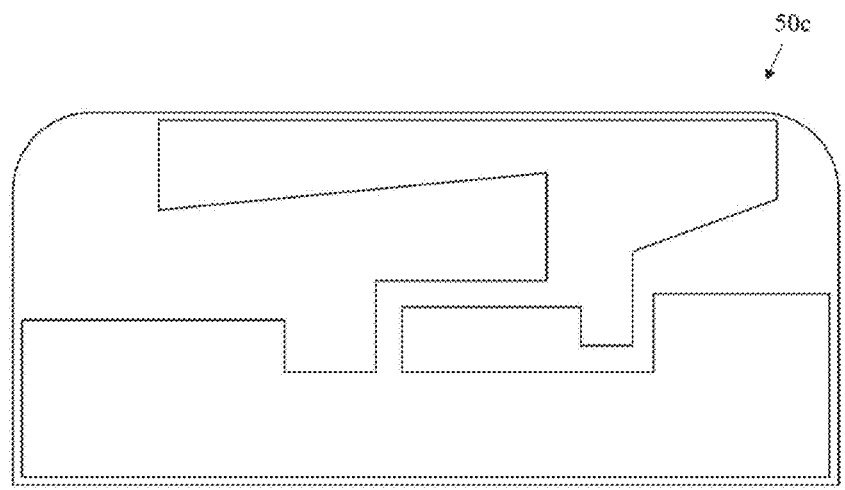
FIG. 5A is a top plan view of the antenna of FIG. 5.
Figure 5B:
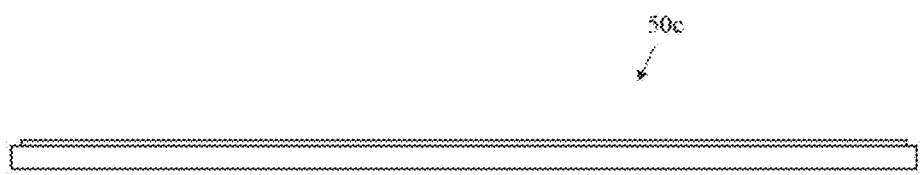
FIG. 5B is a front elevation view of the antenna of FIG. 5.
Figure 6:
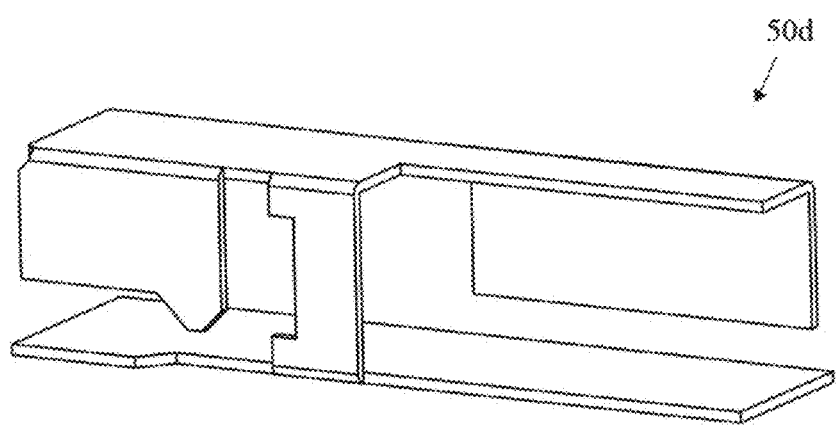
FIG. 6 is a top perspective view of the antenna of item 2 of FIG. 4.
Figure 6A:
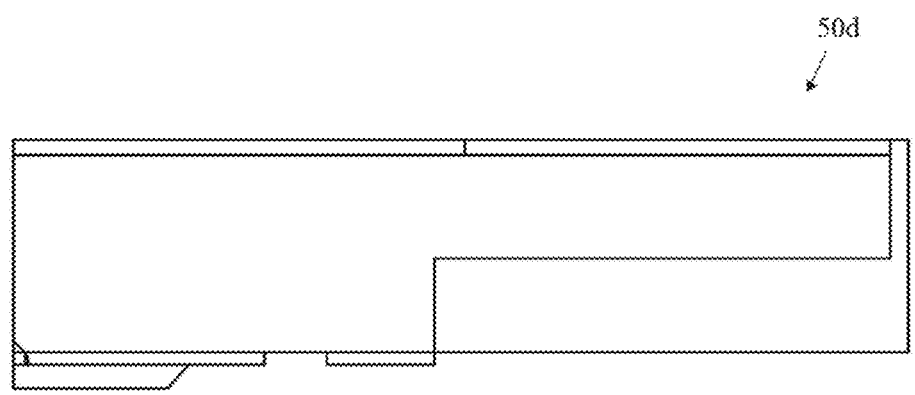
FIG. 6A is a top plan view of the antenna of FIG. 6.
Figure 6B:
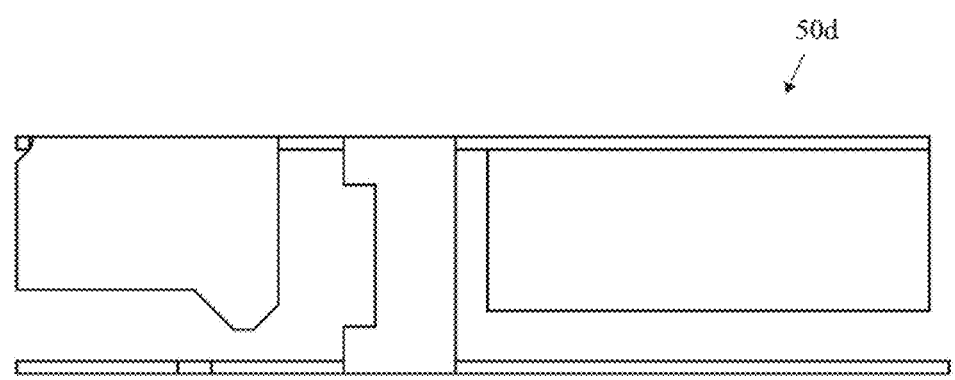
FIG. 6B is a front elevation view of the antenna of FIG. 6.
Figure 6C:
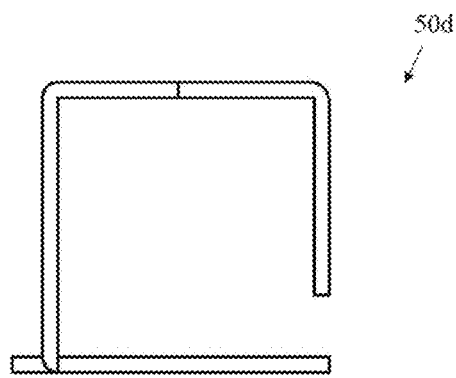
FIG. 6C is a side elevation view of the antenna of FIG. 6.
Figure 6D:
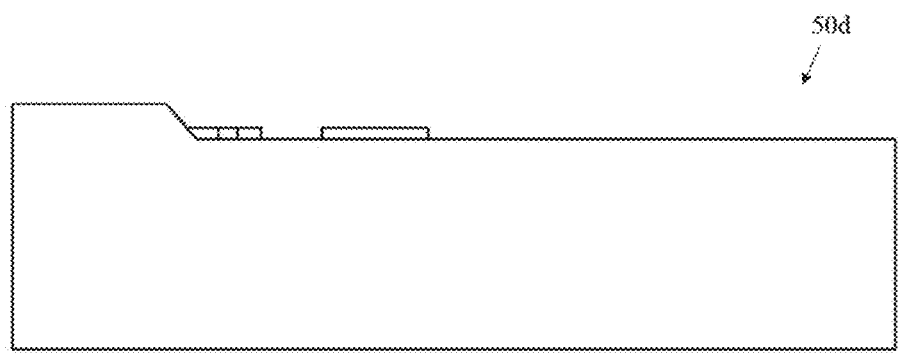
FIG. 6D is a bottom plan view of the antenna of FIG. 6.
Figure 7:
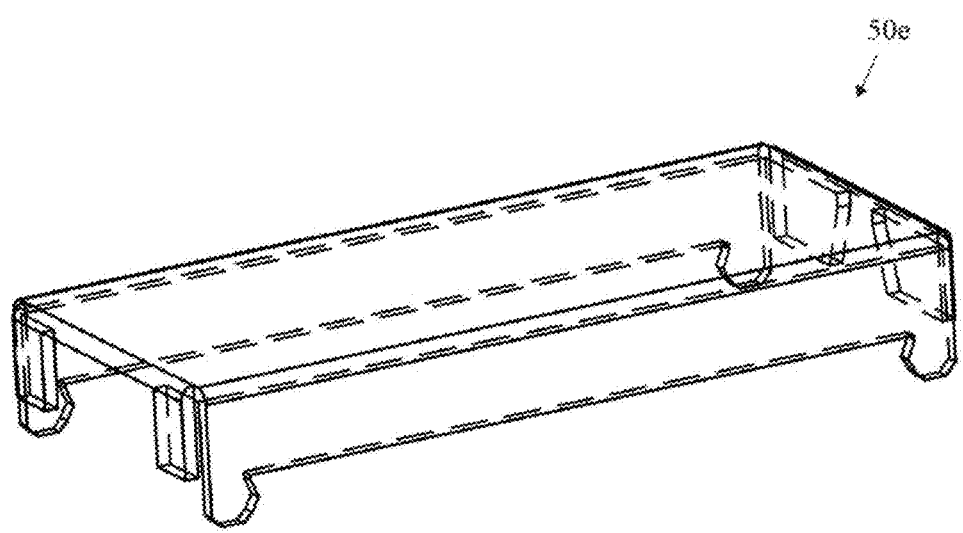
FIG. 7 is a top perspective view of the shield case of item 3 of FIG. 4.
Figure 7A:
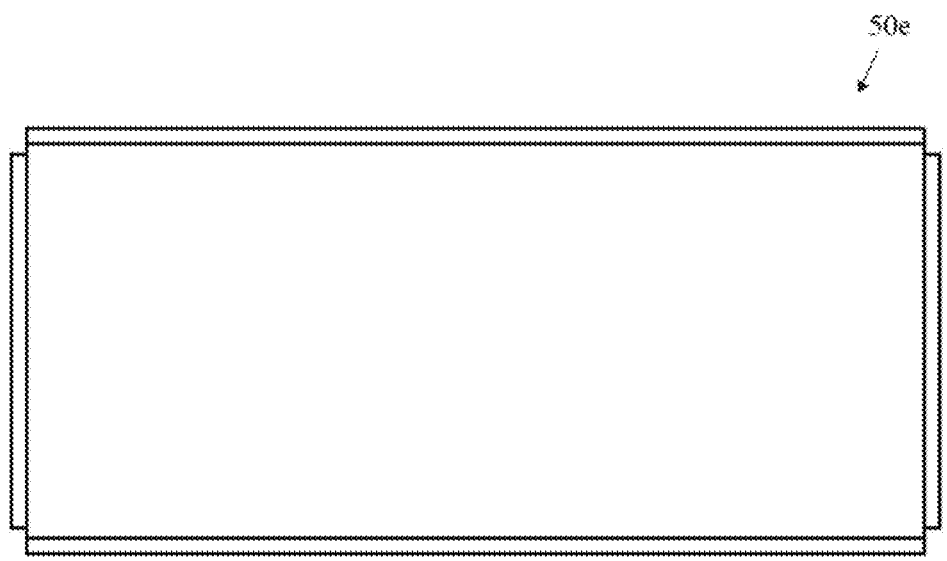
FIG. 7A is a top plan view of the shield case of FIG. 7.
Figure 7B:
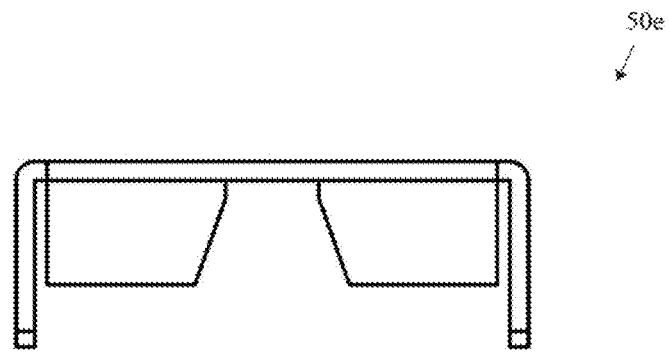
FIG. 7B is a side elevation view of the shield case of FIG. 7.
Figure 7C:
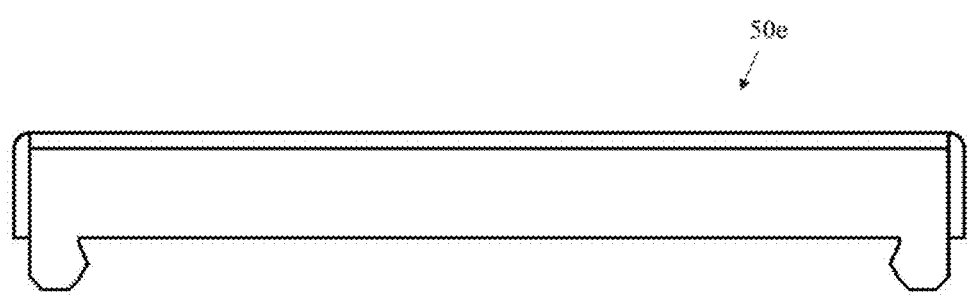
FIG. 7C is a front elevation view of the shield case of FIG. 7.
Figure 7D:
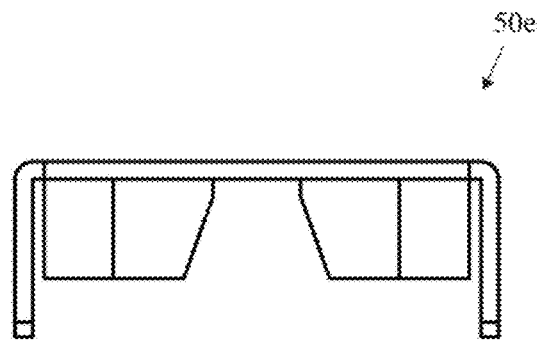
FIG. 7D is a side elevation view of the shield case of FIG. 7.
Figure 7E:
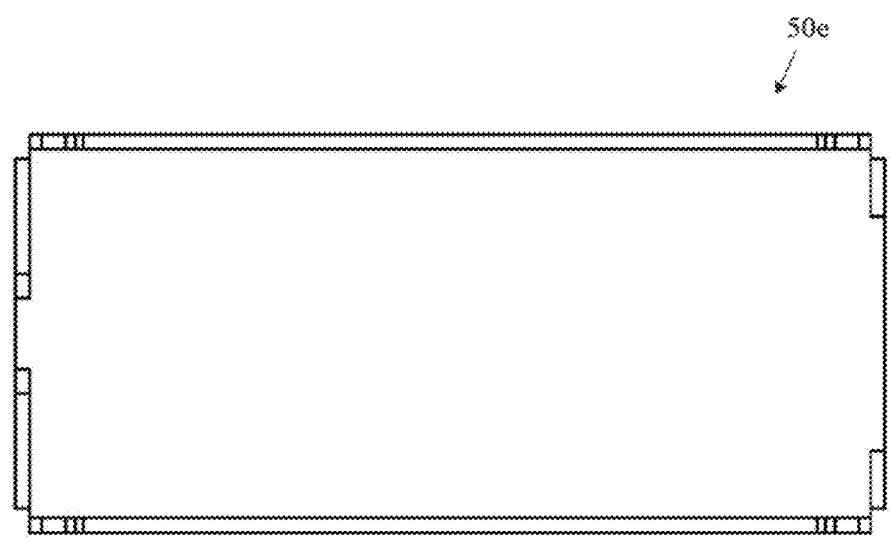
FIG. 7E is a bottom plan view of the shield case of FIG. 7.
Figure 8:
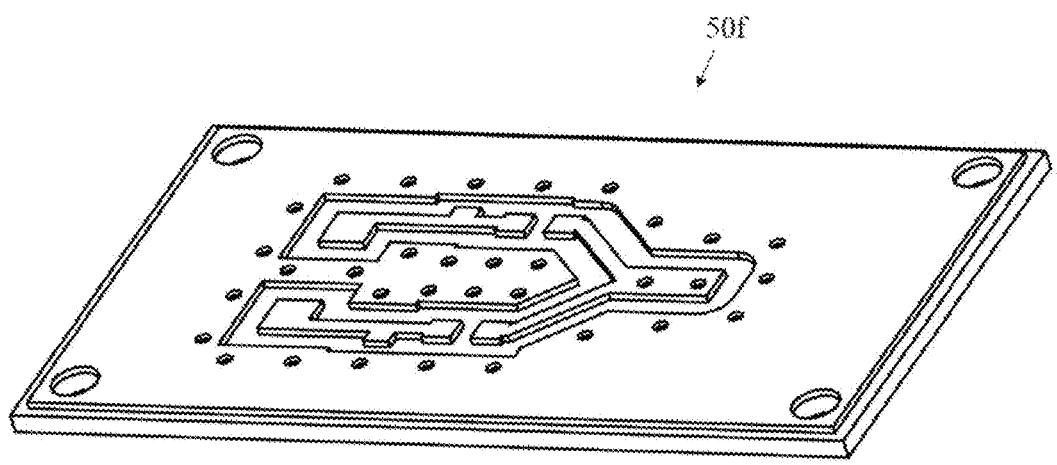
FIG. 8 is a top perspective view of the antenna of item 4 of FIG. 4.
Figure 8A:
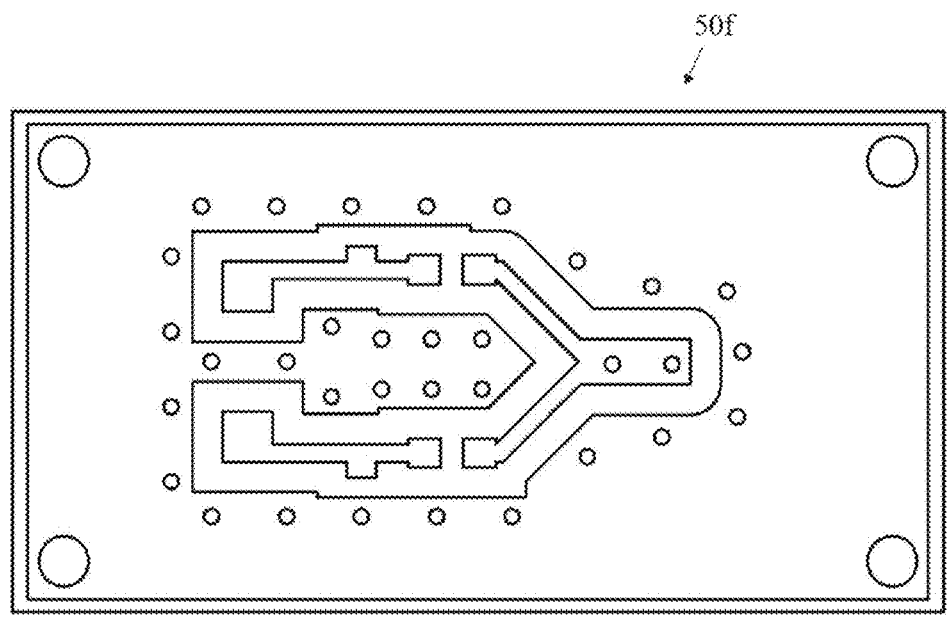
FIG. 8A is a top plan view of the antenna of FIG. 8.
Figure 8B:
FIG. 8B is a front elevation view of the antenna of FIG. 8.
Figure 8C:
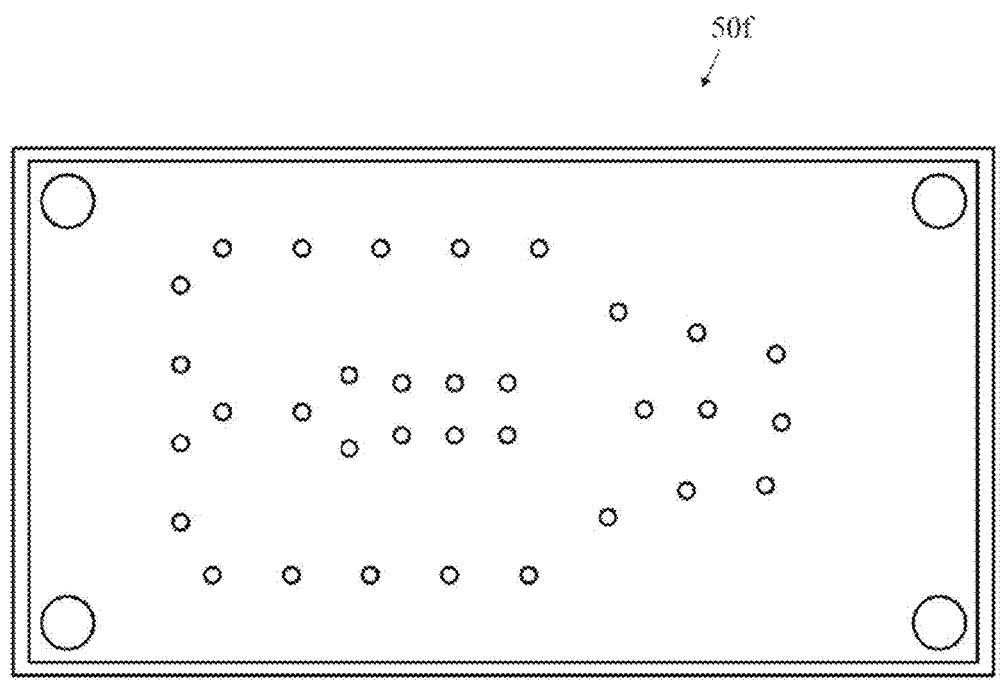
FIG. 8C is a bottom plan view of the antenna of FIG. 8.

One embodiment of an antenna 50c utilized with the antenna system 25 is shown in FIGS. 5, 5A and 5B.

Another embodiment of an antenna 50*d* utilized with the antenna system 25 is shown in FIGS. 6, 6A, 6B, 6C and 6D.

An embodiment of a shield case 50*e* for the combiner shown in FIG. 4 utilized with the antenna system 25 is shown in FIGS. 7, 7A, 7B, 7C, 7D and 7E.

An embodiment of a combiner 50*f* utilized with the antenna system 25 is shown in FIGS. 8, 8A, 8B and 8C.

Figure 9:
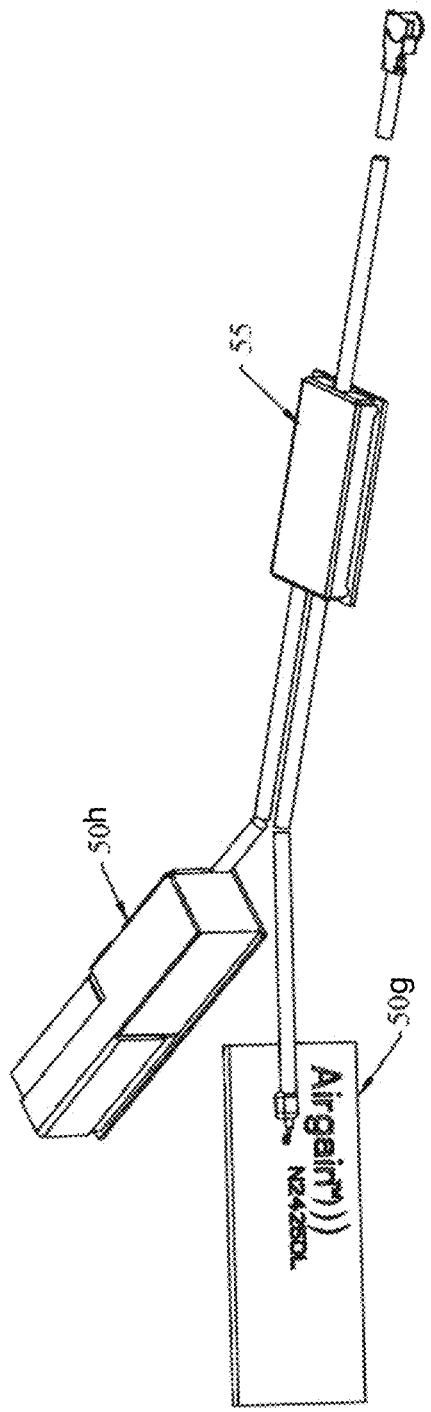
FIG. 9 is an isolated view of the antenna components of the antenna system.

FIG. 9 illustrates the antenna 50*g* as the first antenna, antenna 50*h* as the second antenna, and a combiner 55.

Figure 10:
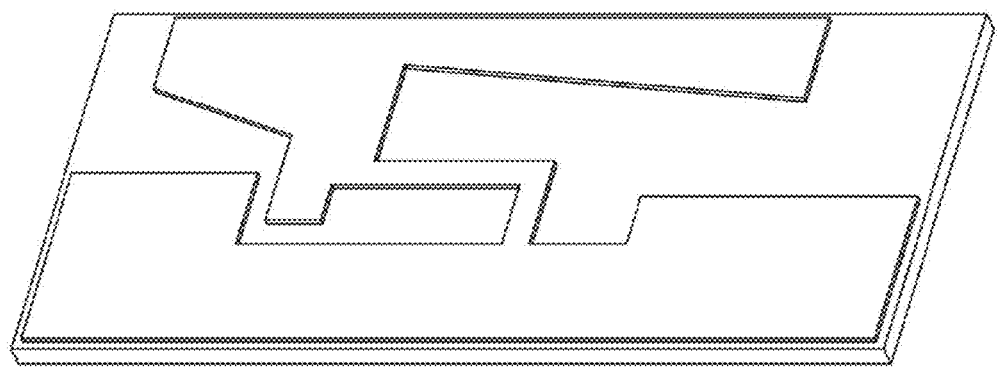
FIG. 10 is a top perspective view of the antenna of item 1 of FIG. 9.
Figure 10A:
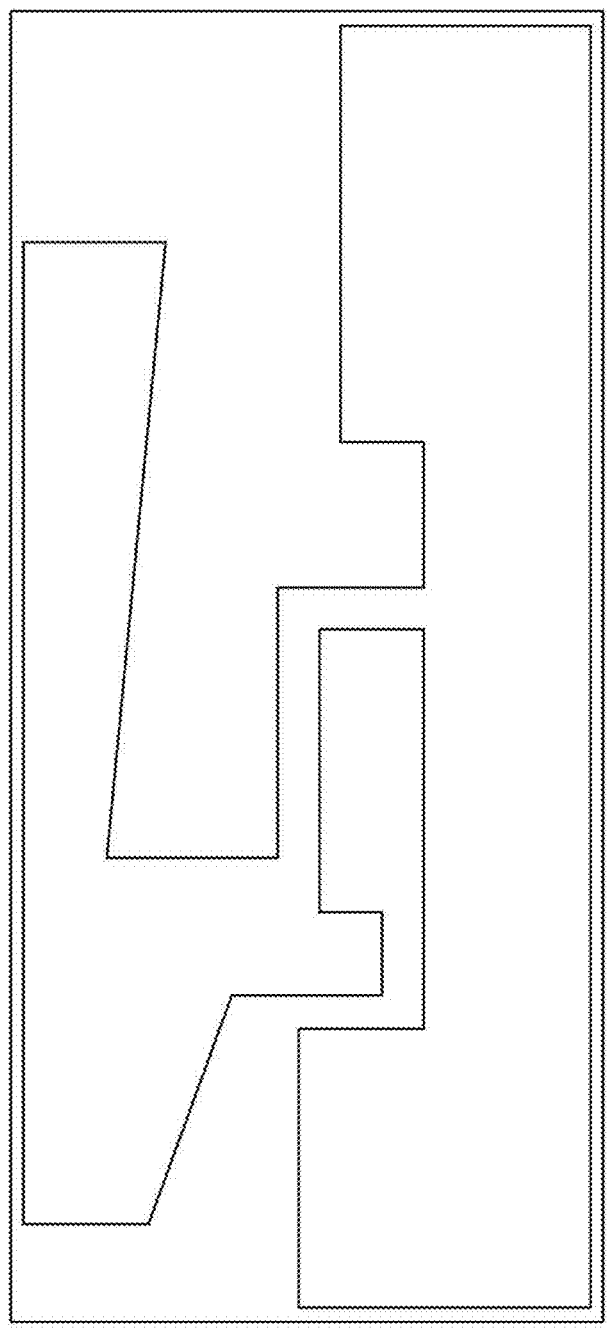
FIG. 10A is a top plan view of the antenna of FIG. 10.
Figure 10B:
FIG. 10B is a front elevation view of the antenna of FIG. 10.
Figure 11:
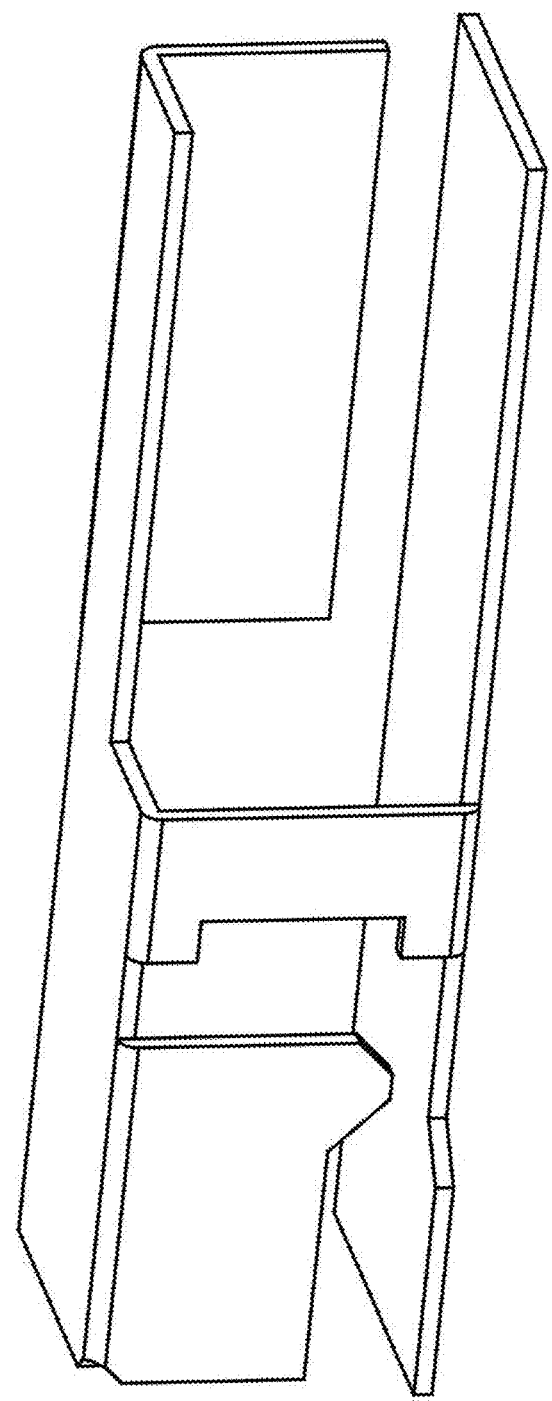
FIG. 11 is a top perspective view of the antenna of item 2 of FIG. 9.
Figure 11A:
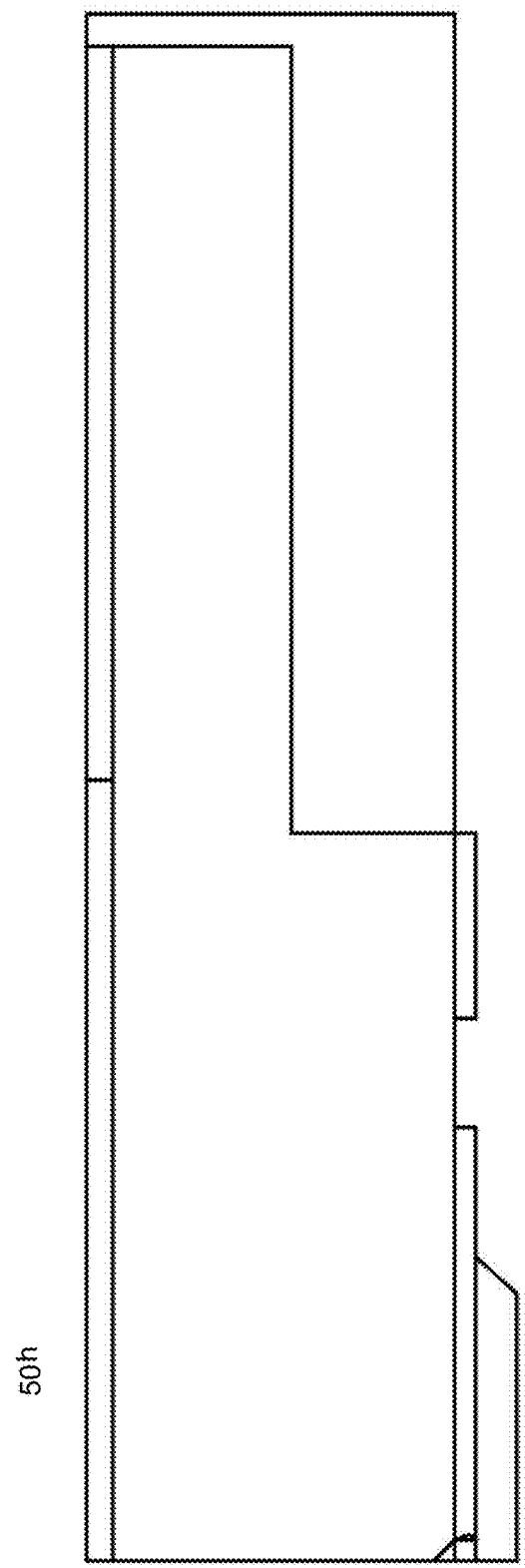
FIG. 11A is a top plan view of the antenna of FIG. 11.
Figure 11B:
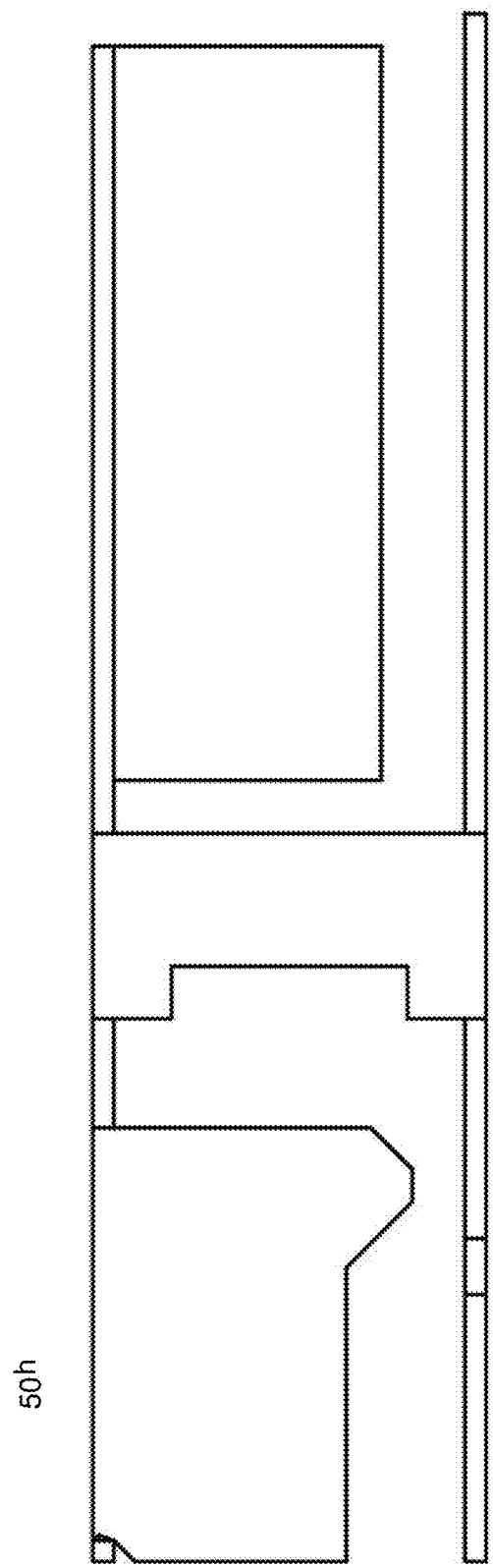
FIG. 11B is a front elevation view of the antenna of FIG. 11.
Figure 11C:
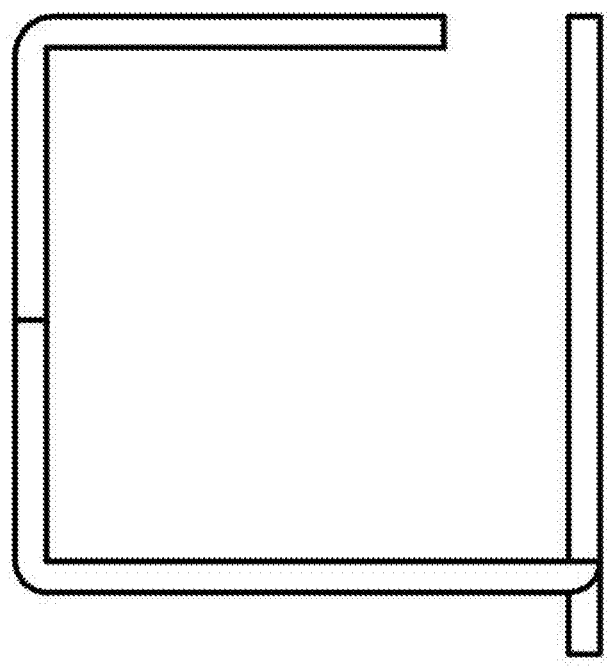
FIG. 11C is a side elevation view of the antenna of FIG. 11.
Figure 12:
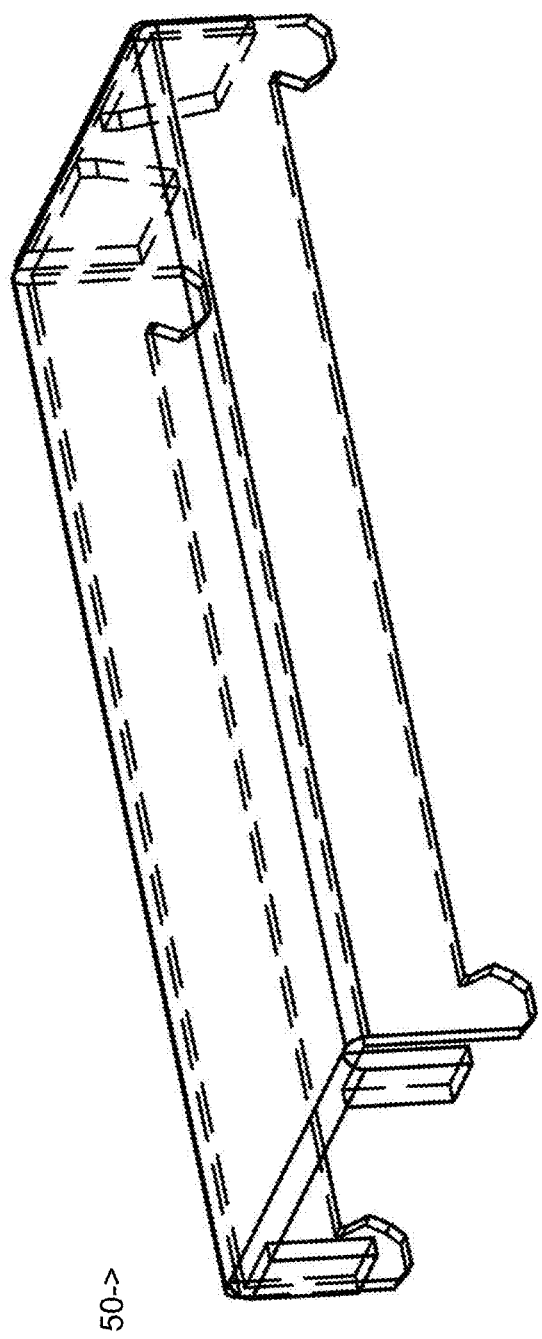
FIG. 12 is a top perspective view of the shield case of item 3 of FIG. 9.
Figure 12B:
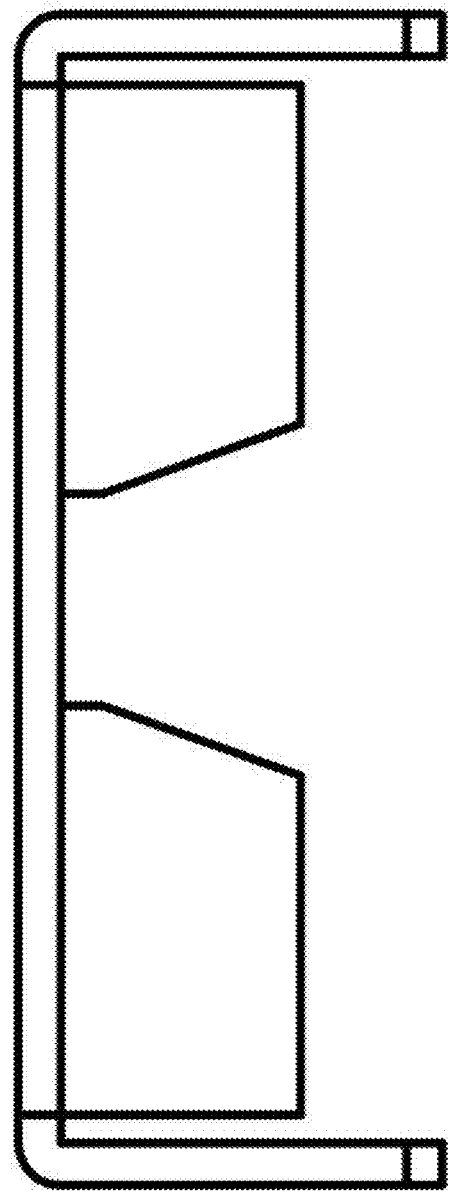
FIG. 12B is a side elevation view of the shield case of FIG. 12.
Figure 12D:
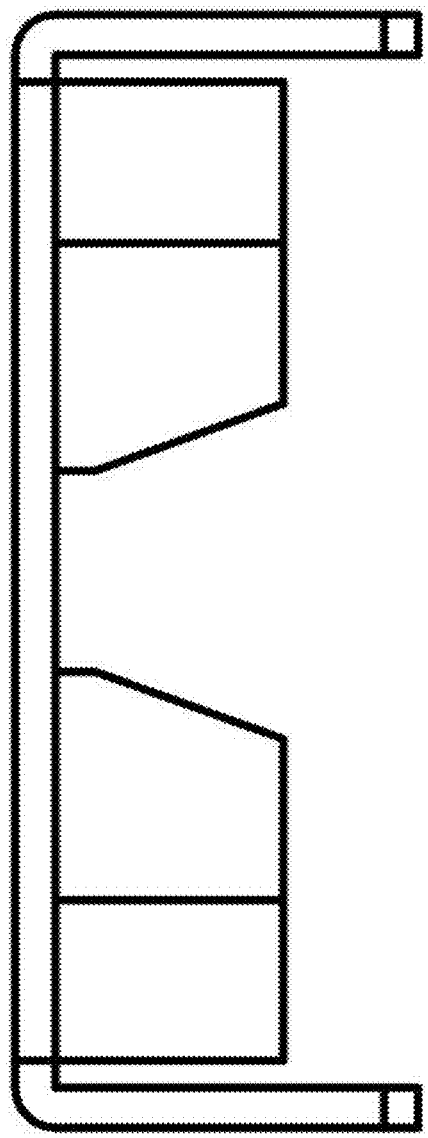
FIG. 12D is a side elevation view of the shield case of FIG. 12.
Figure 12E:
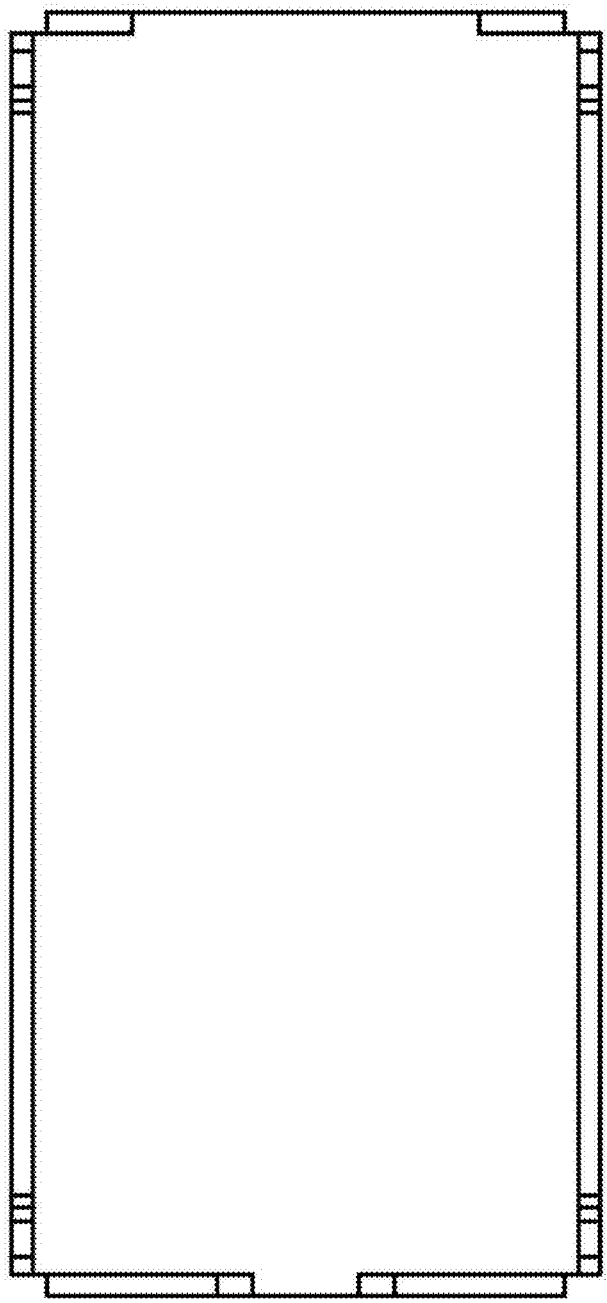
FIG. 12E is a bottom plan view of the shield case of FIG. 12.
Figure 13:
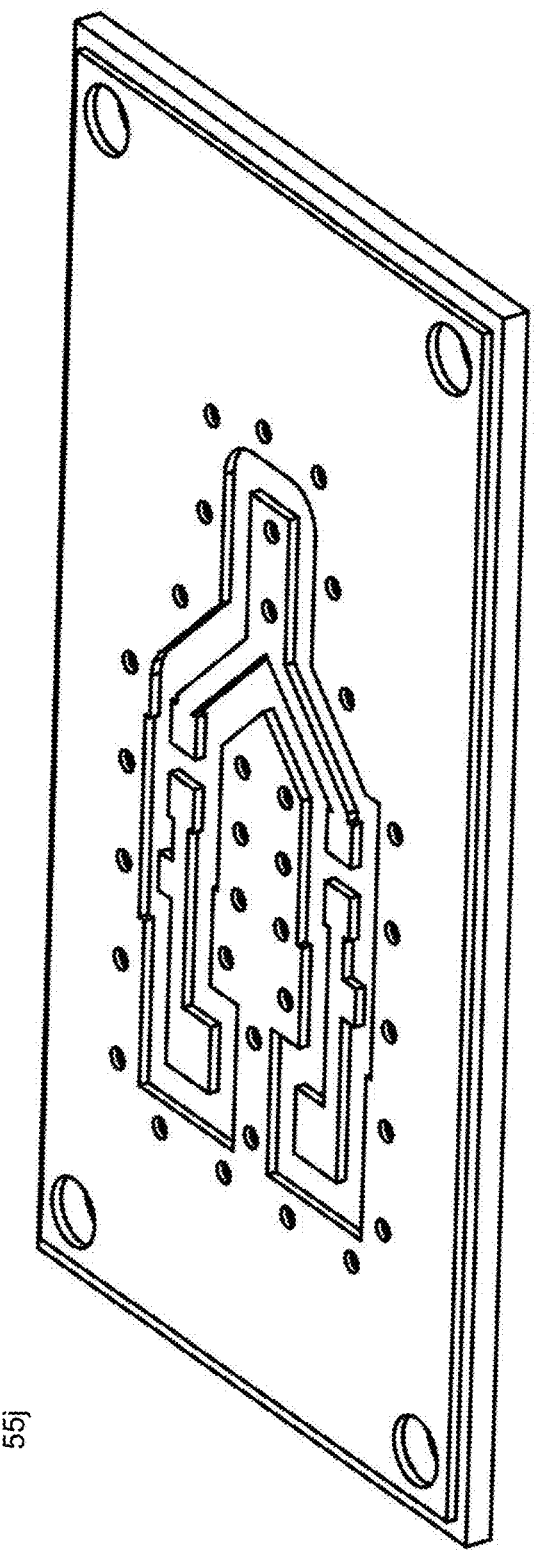
FIG. 13 is a top perspective view of the combiner of item 4 of FIG. 9.
Figure 13A:
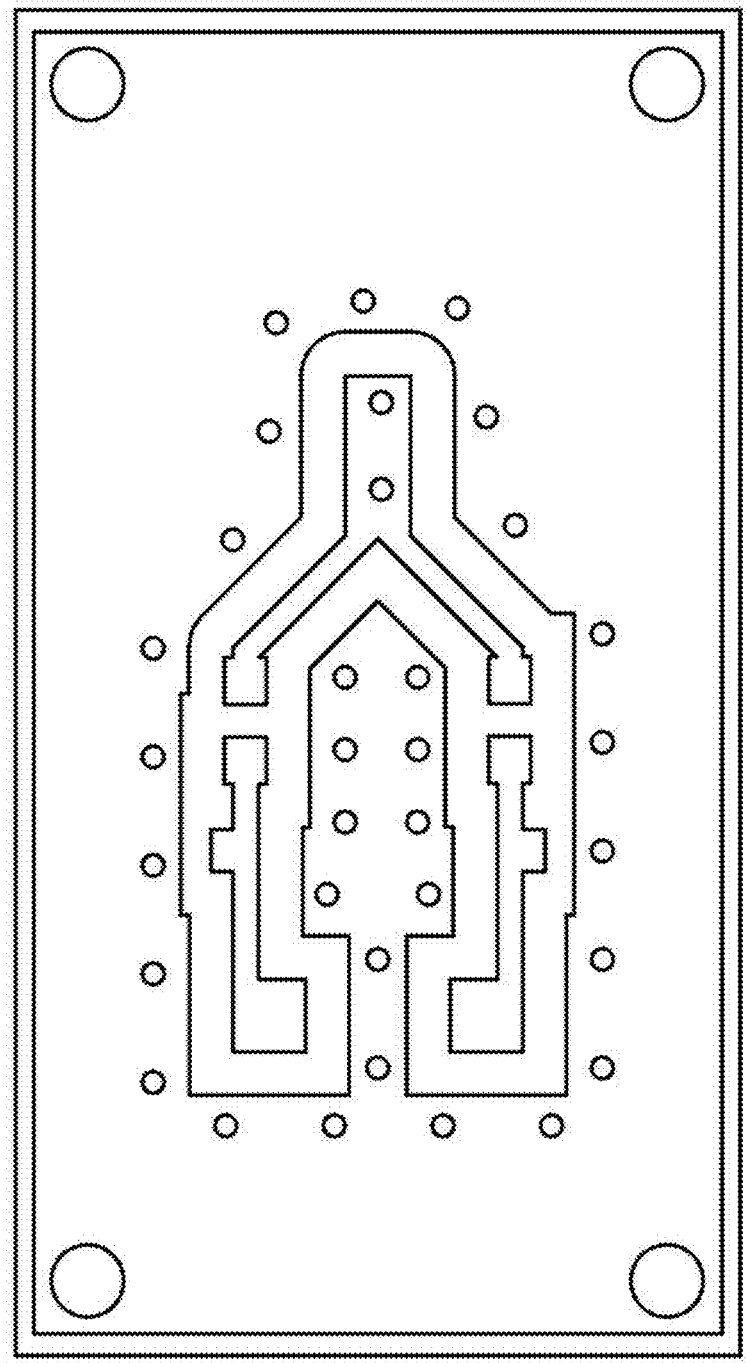
FIG. 13A is a top plan view of the combiner of FIG. 13.
Figure 13B:
FIG. 13B is a front elevation view of the combiner of FIG. 13.
Figure 14:
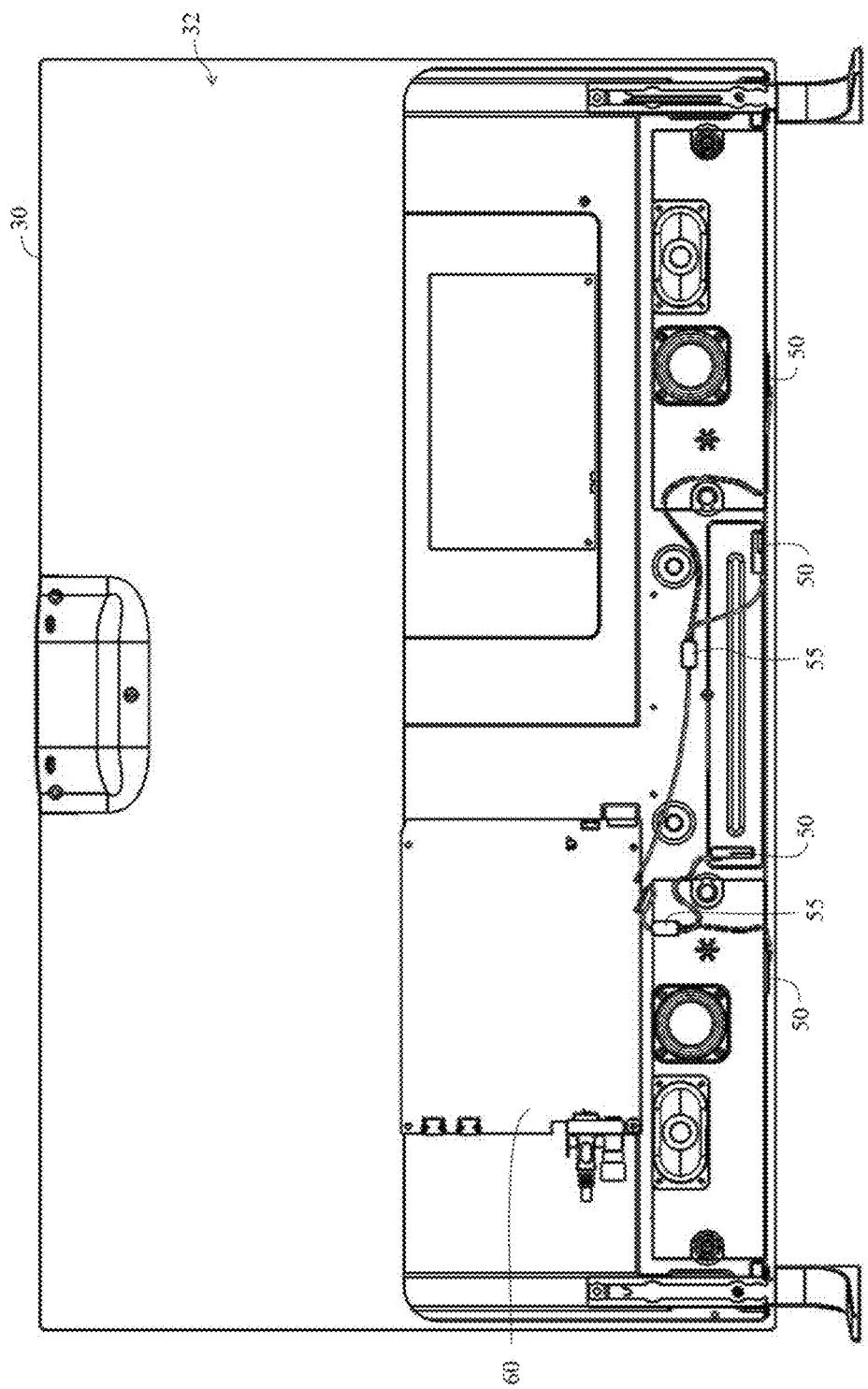
FIG. 14 is a view of an open back of a flat screen television with an antenna system.
Figure 15:
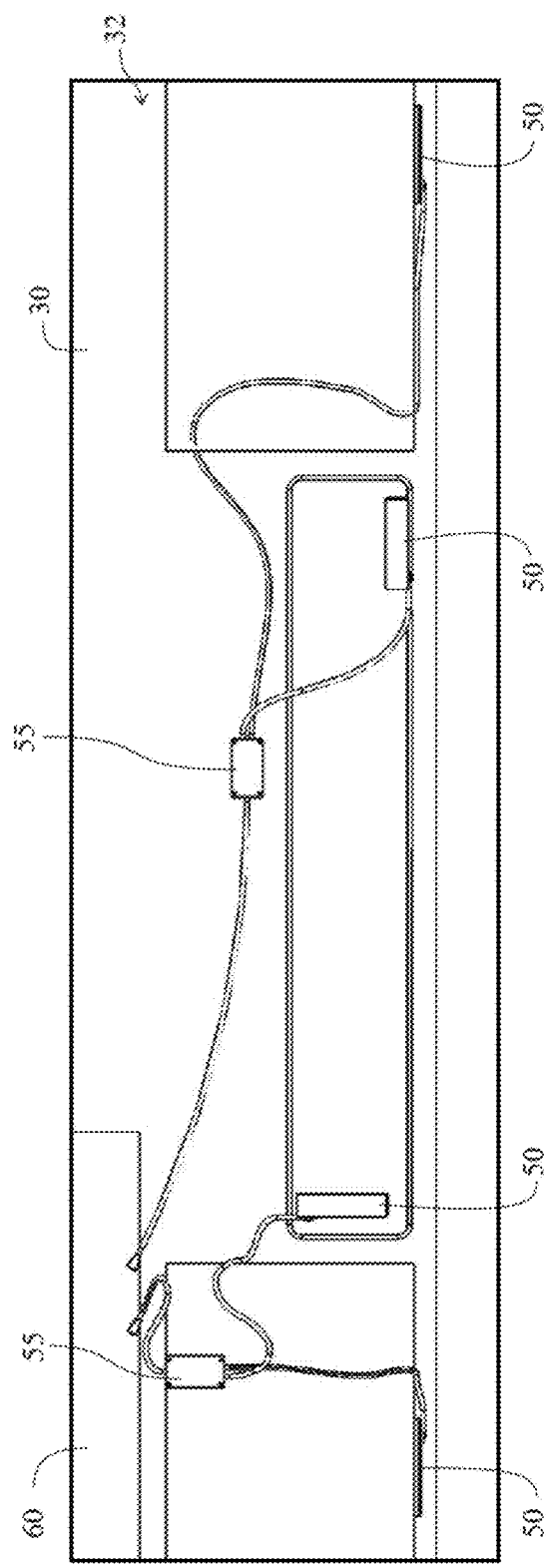
FIG. 15 is an isolated view of antenna components of FIG. 14.
Figure 16:
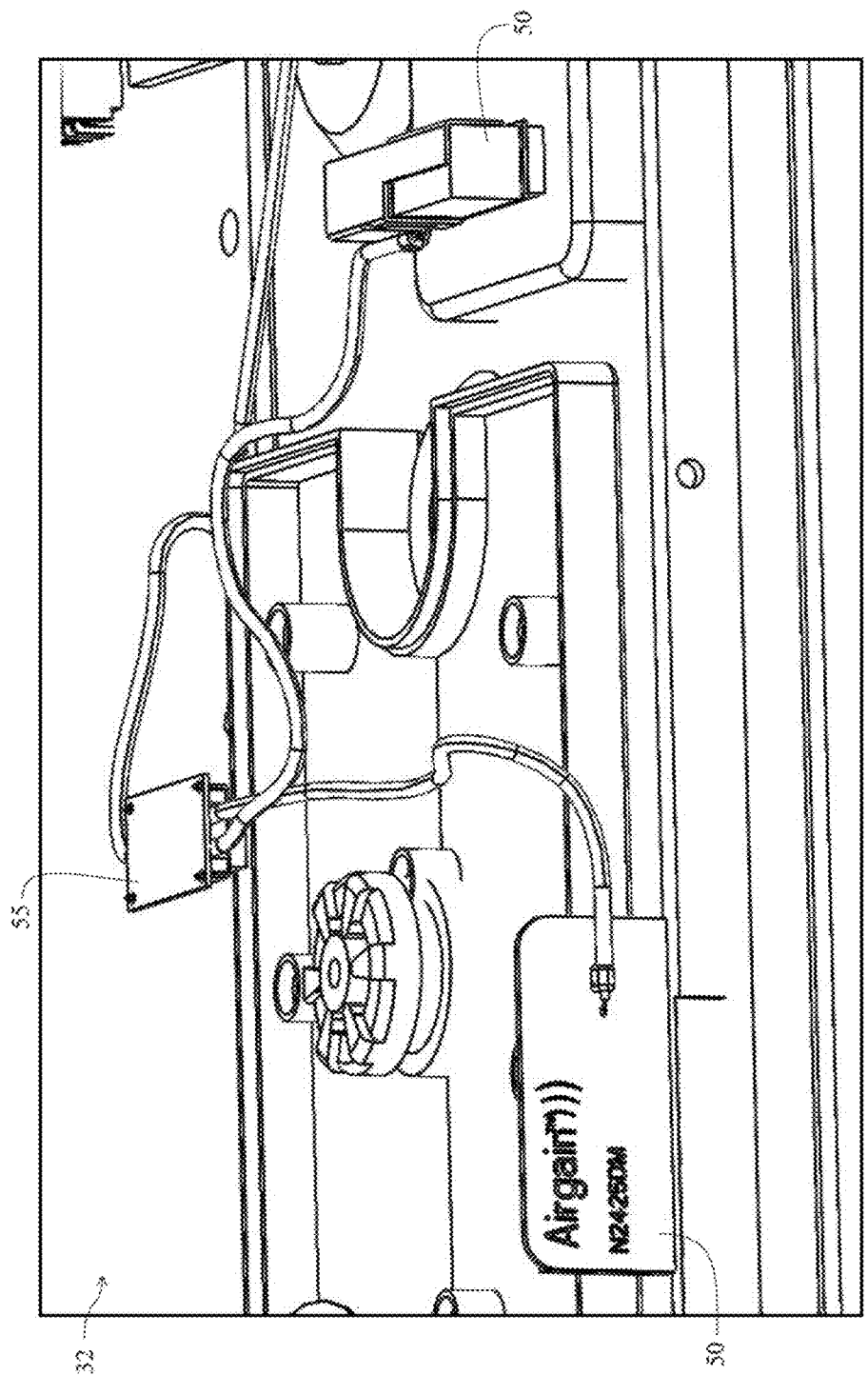
FIG. 16 is an isolated view of antenna components of FIG. 14.
Figure 17:
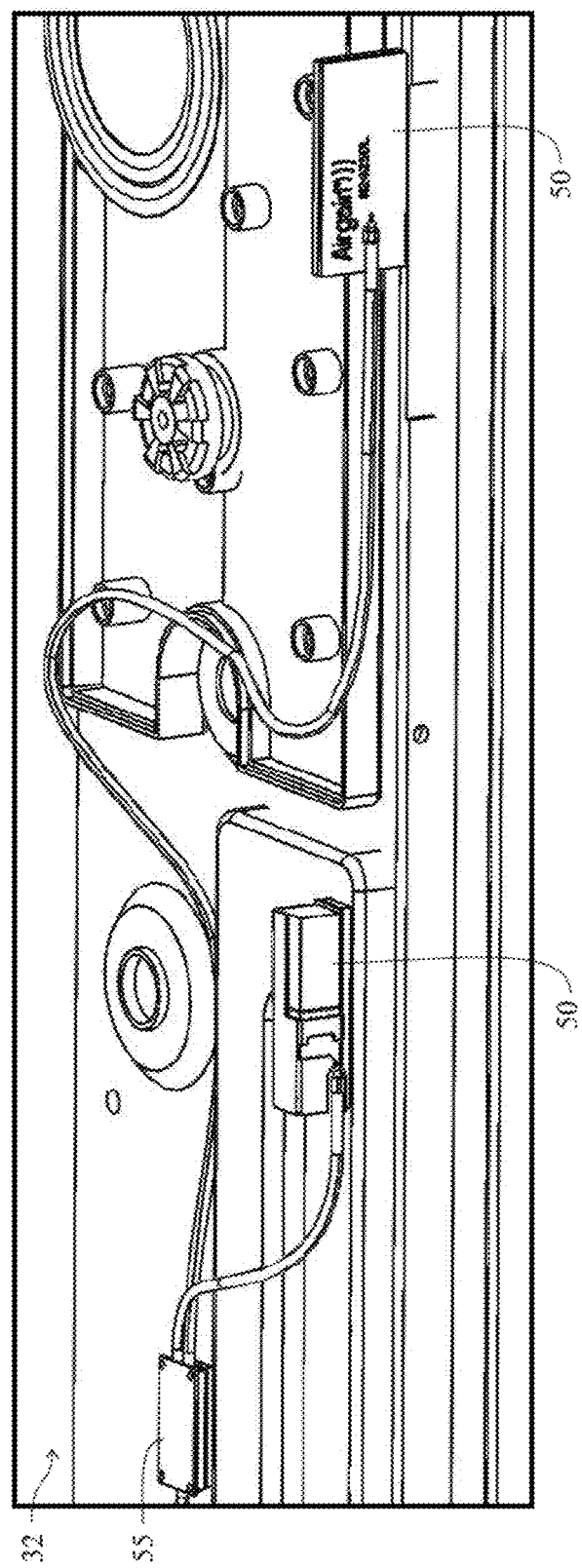
FIG. 17 is an isolated view of antenna components of FIG. 14.
Figure 18:
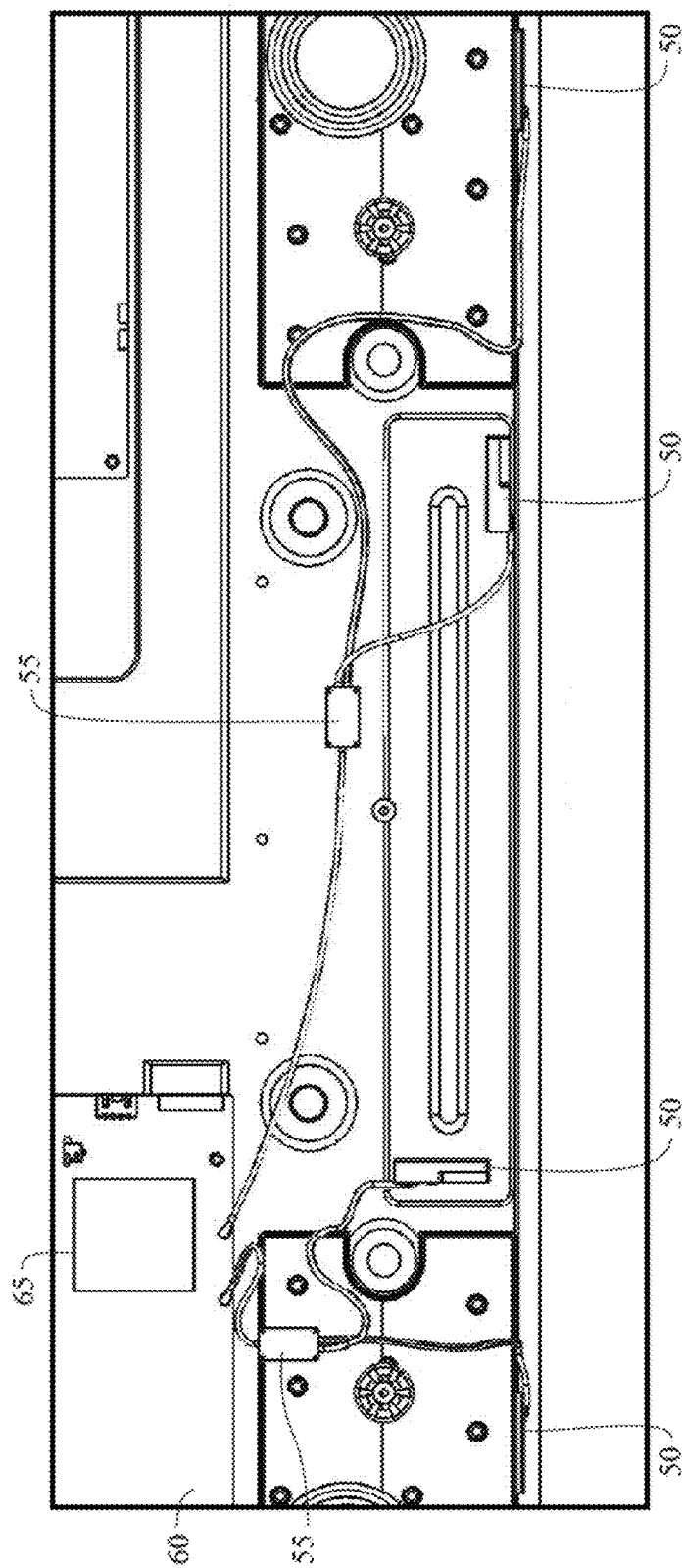
FIG. 18 is an isolated view of antenna components of FIG. 14.

Another embodiment of an antenna 50*g* utilized with the antenna system 25 is shown in FIGS. 10, 10A and 10B.

Another embodiment of an antenna 50*h* utilized with the antenna system 25 is shown in FIGS. 11, 11A, 11B, 11C and 11D.

An embodiment of a shield case 50*i* for the combiner shown in FIG. 9 utilized with the antenna system 25 is shown in FIGS. 12, 12A, 12B, 12C, 12D and 12E.

An embodiment of a combiner 55*j* of FIG. 9 utilized with the antenna system 25 is shown in FIGS. 13, 13A, 13B and 13C.

Figure 29:
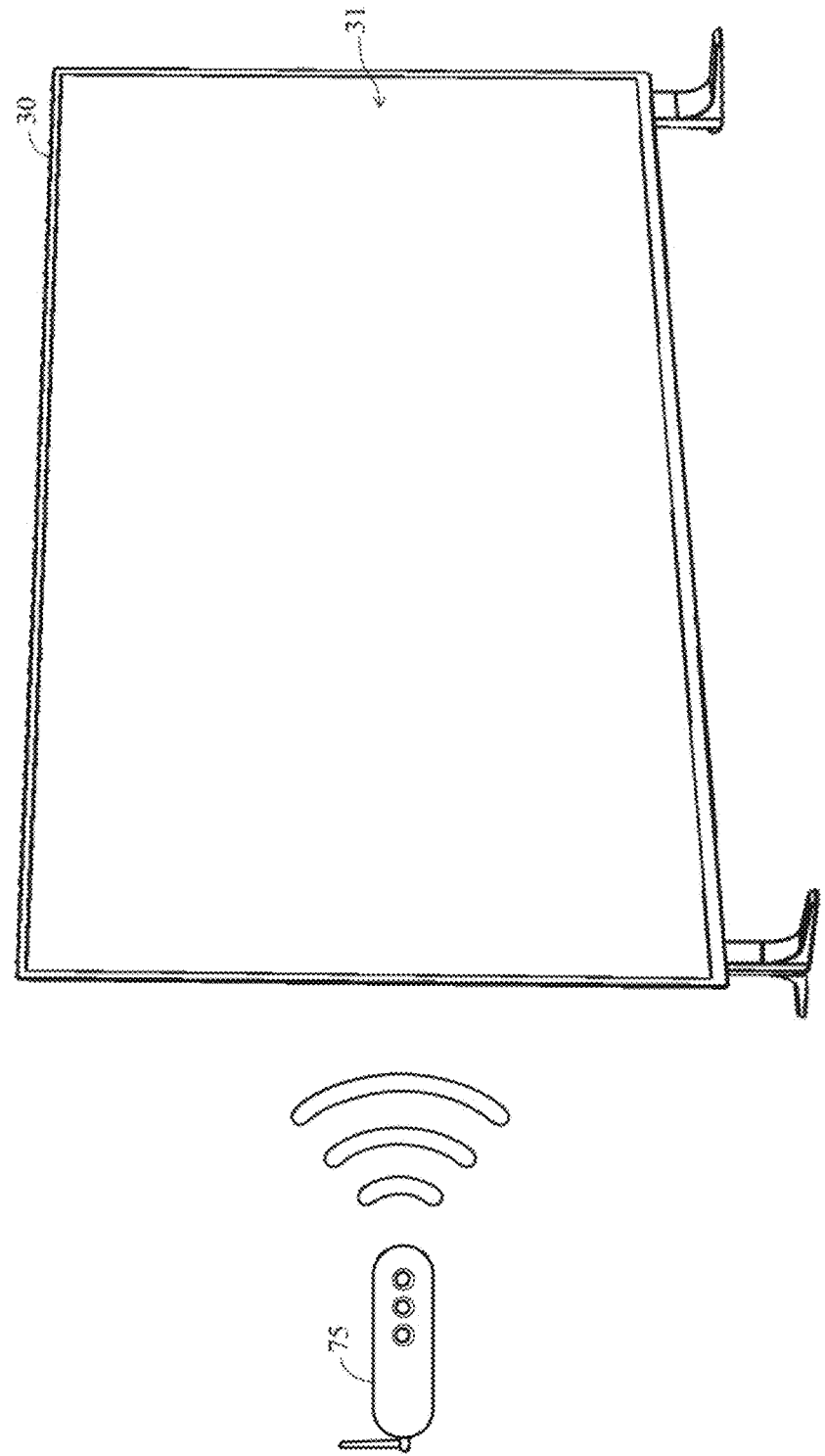
FIG. 29 is an illustration of a front of a television.
Figure 30:
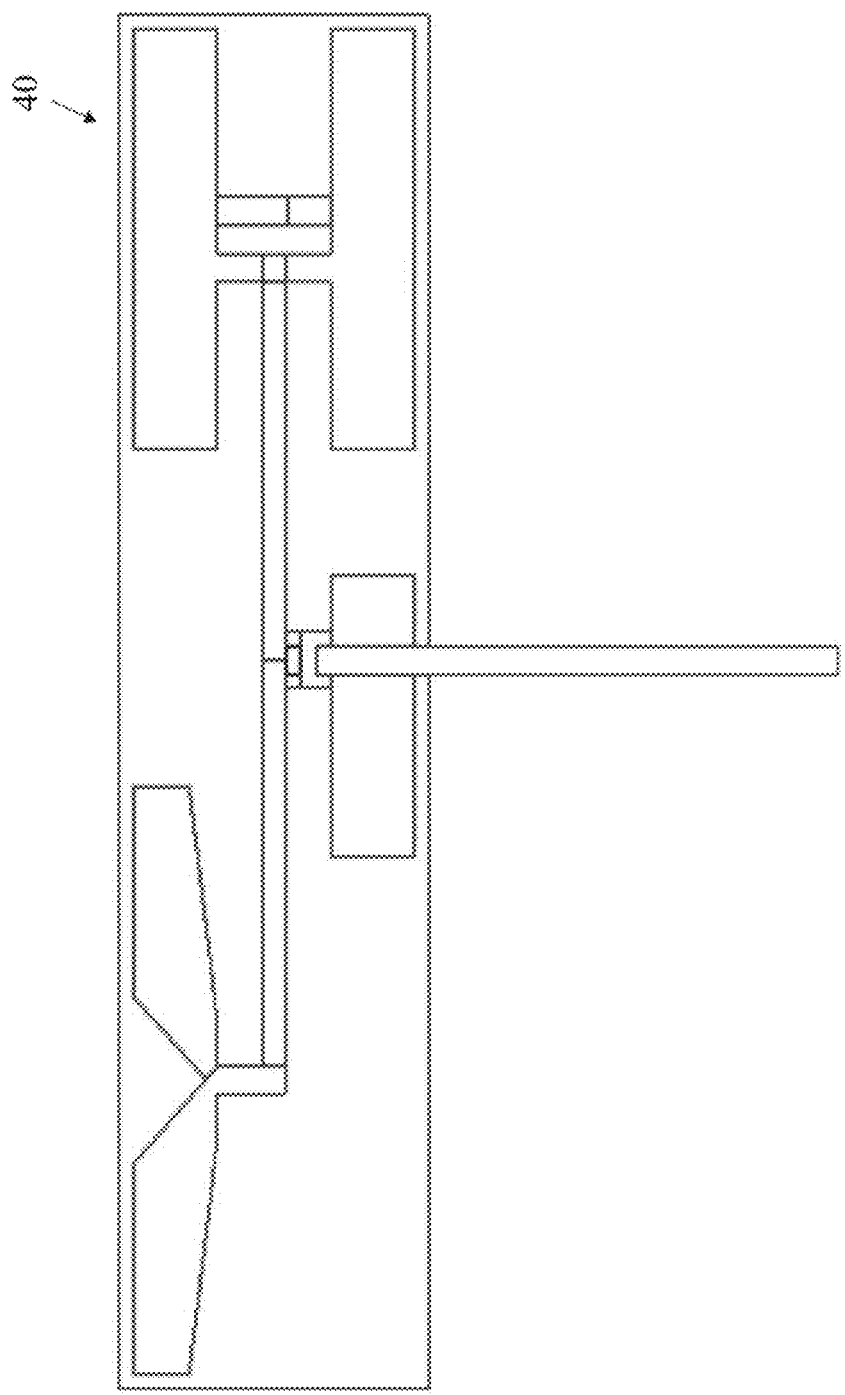
FIG. 30 is a single feed split to two antennas separated by ½ wavelength for a single box solution antenna system for a large appliance.
Figure 31:
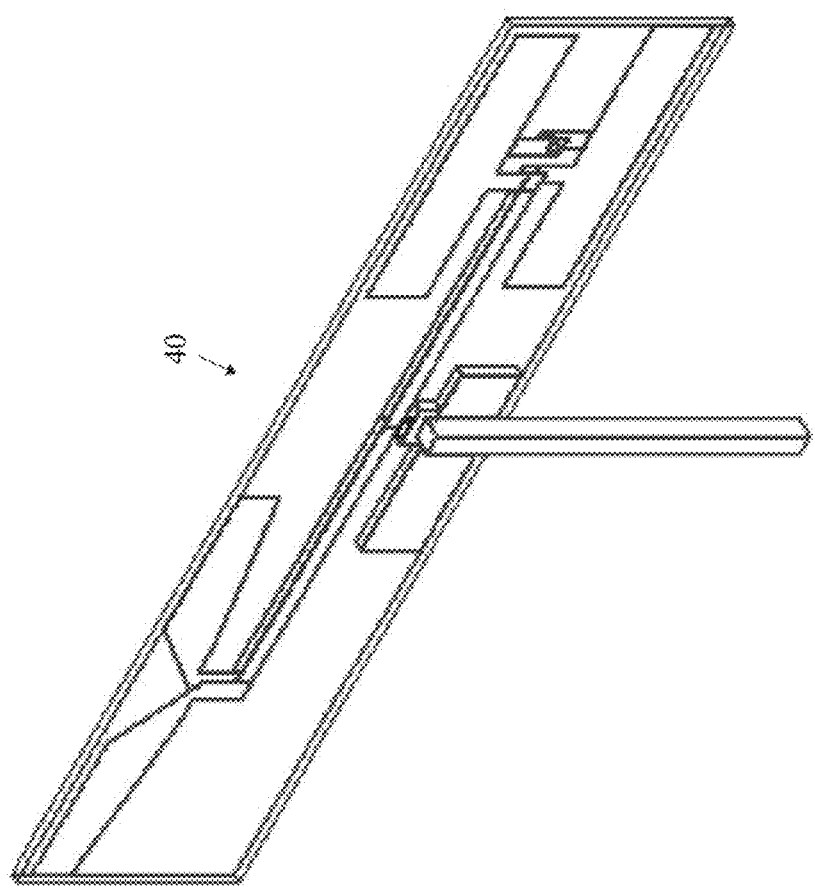
FIG. 31 is a top perspective view of the PCB of FIG. 30.
Figure 32:
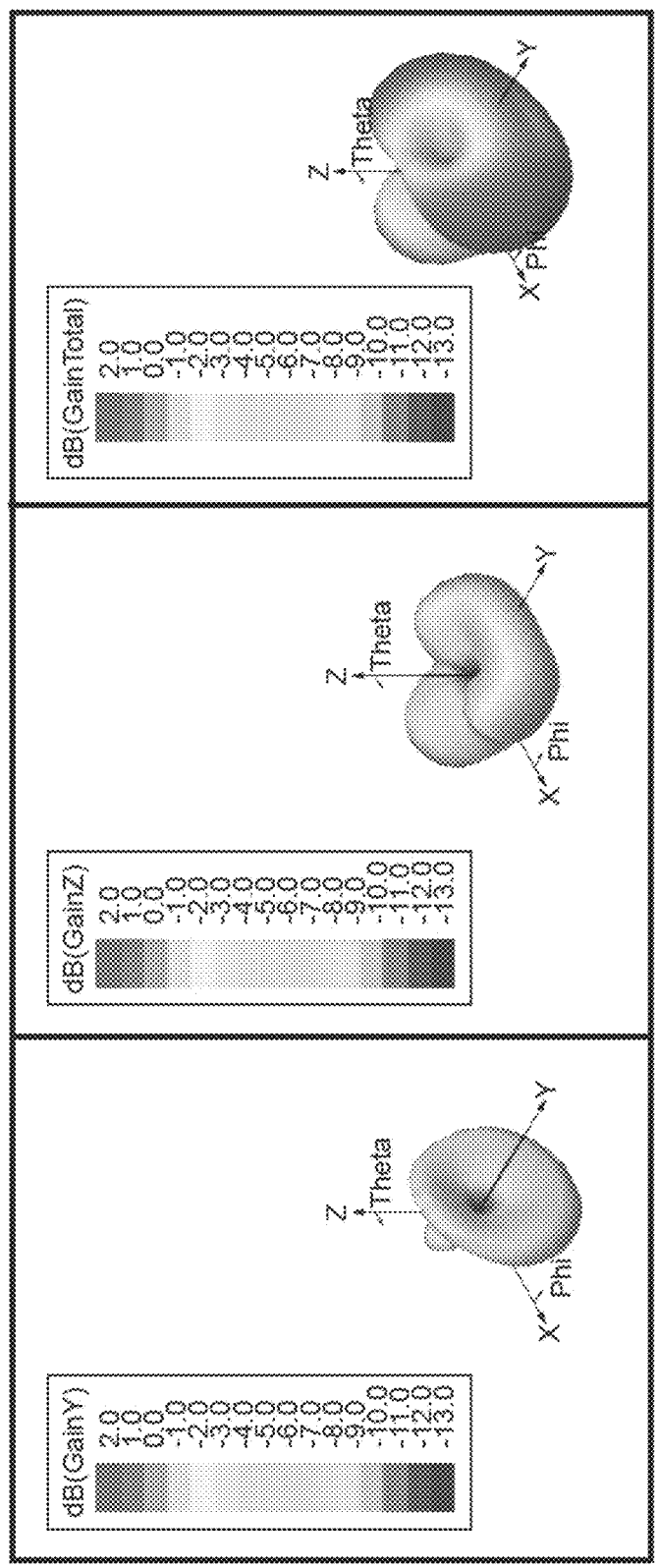
FIG. 32 illustrates Y-polarized gain on the left antenna, Z-polarized gain on the right antenna and total gain, for the single box solution antenna system of FIG. 30.

Another embodiment shown in FIG. 29 is an antenna system 25 for a large appliance. The antenna system 25 comprises a large appliance 30 having a front surface 31 and a rear surface 32, a printed circuit board ("PCB") 40 having a first antenna 50 and a second antenna 50, a radio 60, and a processor 65. The strongest signal of the first antenna 50 and the second antenna 50 is selected to receive a wireless signal. FIGS. 30-31 is a single feed split to two antennas separated by ½ wavelength for a single box solution antenna system for a large appliance. FIG. 32 illustrates Y-polarized gain on the left antenna, Z-polarized gain on the right antenna and total gain, for the single box solution antenna system of FIG. 30.

Preferably, the large appliance 25 has a surface area of at least two times the wavelength of the antenna signal. Preferably, the large appliance 25 has a surface area of at least five times the wavelength of the antenna signal.

Preferably, the PCB 40 ranges from 30 to 60 mm in length, 8 to 15 mm in height, and 0.4 to 0.7 mm in thickness. Most preferably, the PCB 40 is 49 mm in length, 11 mm in height, and 0.5 mm in thickness.

Preferably, the first antenna 50 is a horizontal polarized antenna and the second antenna 50 is a vertical polarized antenna.

In a most preferred embodiment, the first antenna 50 and the second antenna 50 are separated by a distance of at least 30 mm.

Preferably, the first antenna 50 is a 5.15 Ghz antenna and the second antenna 50 is a 5.85 GHz antenna.

Preferably, the first antenna 50 and the second antenna 50 are from a single feed slit and separated by ½ wavelength.

Another embodiment shown in FIGS. 14-18 is an antenna system 25 or a large screen television. The antenna system 25 comprises a large television having a display surface 31 and a rear surface 32, a first antenna 50 mounted on the rear surface 32, a second antenna 50 mounted on the rear surface 32, a combiner 55 in communication with the first antenna 50 and the second antenna 50, a radio 60, and a processor 65. The combiner 55 selects the strongest signal of the first antenna 50 and the second antenna 50 to receive a wireless signal from a wireless access point 75.

Preferably, the large television is a 4K high definition television.

Preferably, the large television is at least a 42 inch television.

Preferably, the large television 25 has a surface area of at least nine square feet. Preferably, the large television 25 has a metal surface that blocks antenna signals from a wireless access point 75.

Figure 19:
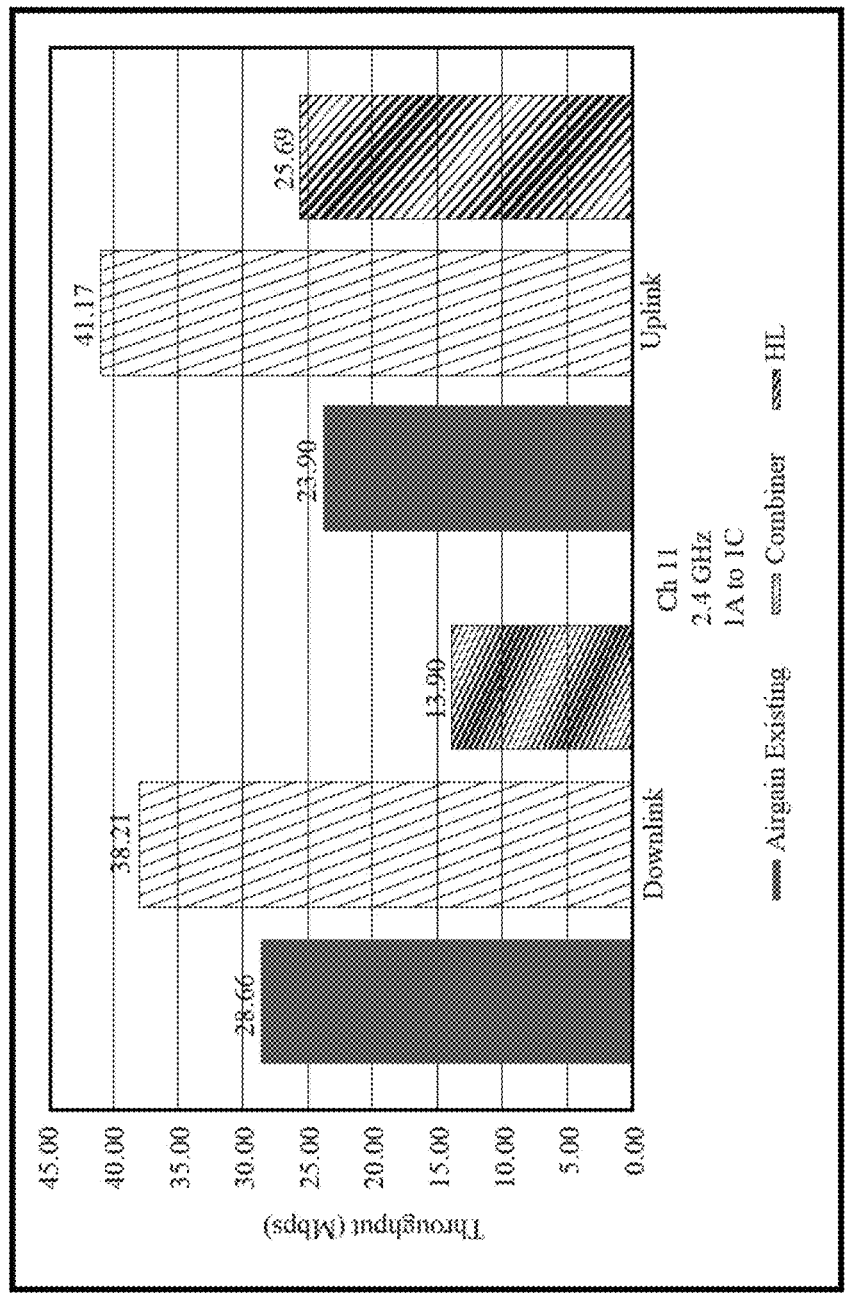
FIG. 19 is a graph of overall throughput at 2.4 GHz.

FIG. 19 illustrates a comparison of overall throughput at 2.4 GHz for a current basic antenna system (Airgain existing), the antenna system of the present invention (combiner) and an HL antenna system (basic antenna system in a smart TV). During the test, the wireless access point was twenty meters away from the antenna system 25 of the large appliance.

Figure 20:
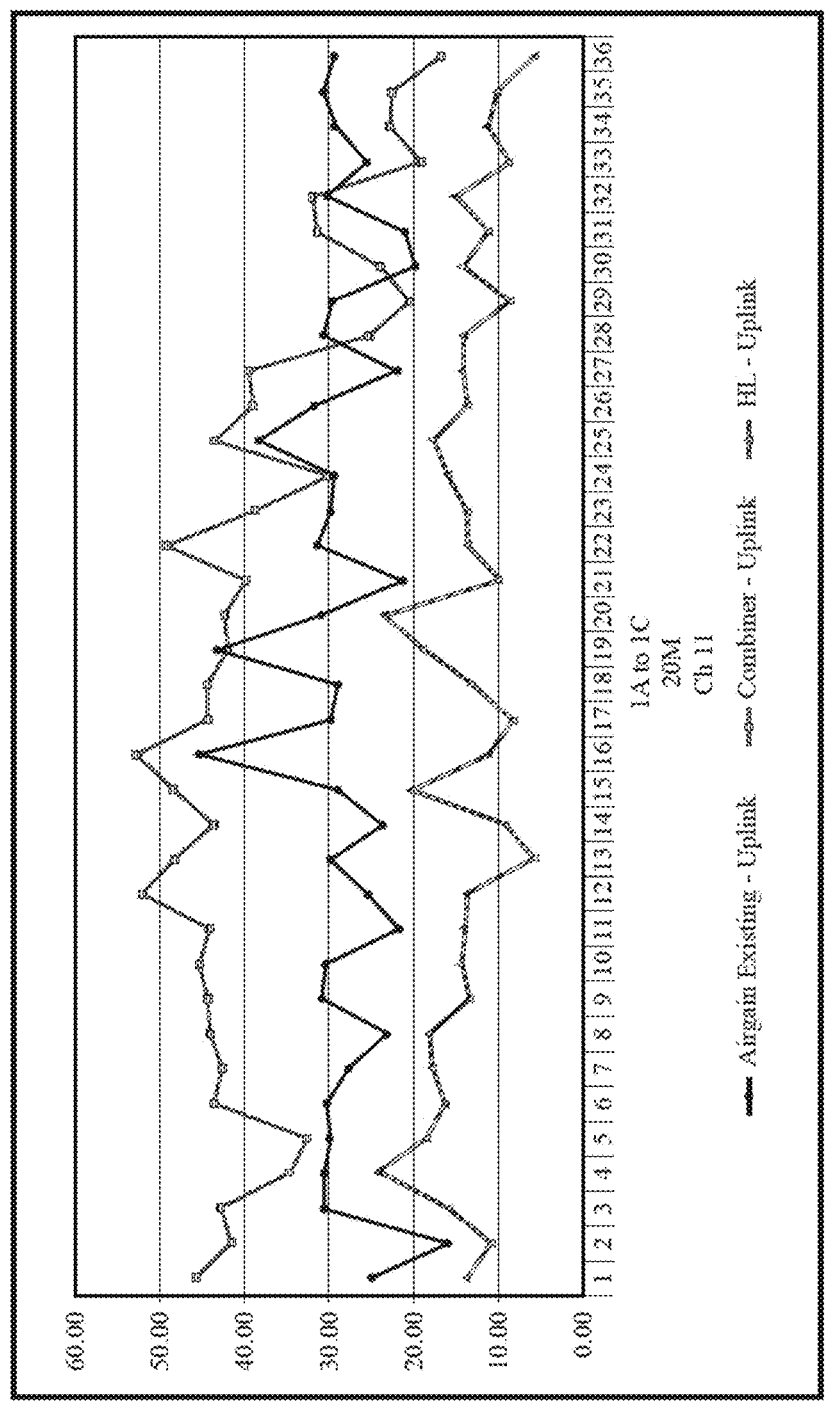
FIG. 20 is a step chart of 2.4 Ghz uplink.

FIG. 20 is a step chart of 2.4 Ghz downlink comparison for a current basic antenna system (Airgain existing), the antenna system of the present invention (combiner) and an HL antenna system.

Figure 21:
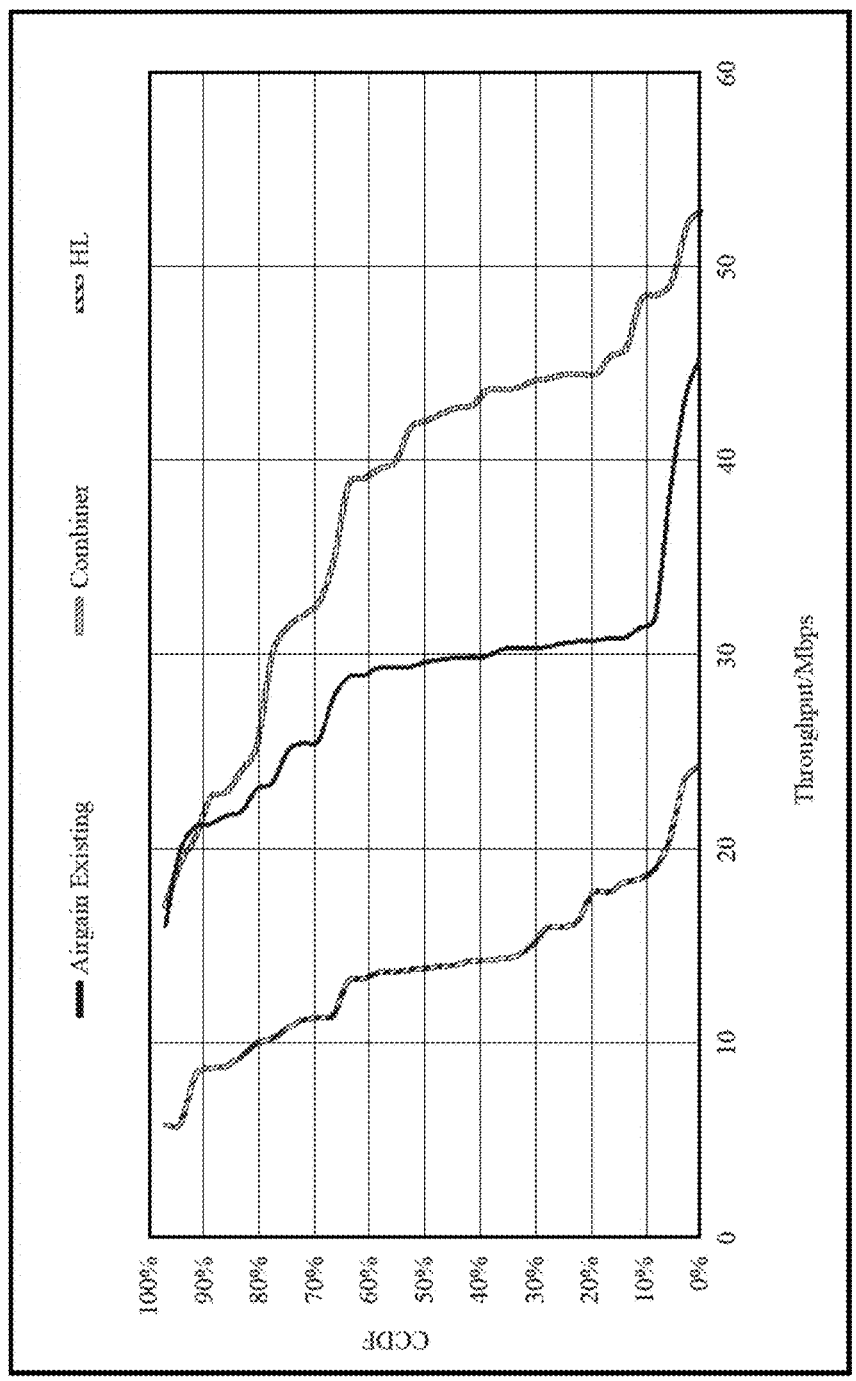
FIG. 21 is a graph of a complimentary cumulative distribution function at 2.4 GHz downlink.

FIG. 21 is a graph of a complimentary cumulative distribution function ("CCDF") at 2.4 GHz downlink comparison for a current basic antenna system (Airgain existing), the antenna system of the present invention (combiner) and an HL antenna system. The grand average throughput is calculated from the average throughput for each of K test steps (constellations C). The probability of the observed throughput level t_obs being higher than the prescribed value t is given by the CCDF. The CCDF is: $CCDF(t;C)=1-Prob\{t\_obs \leq t\}$ where C denotes the set of applied test steps (constellations).

The CCDF provides more information about the overall wireless system performance than just an average throughput value. The CCDF describes a probability of achieving a certain level of throughput. The CCDF is calculated using all N*K measured samples where N is the number of samples measured for a single constellation.

Figure 22:
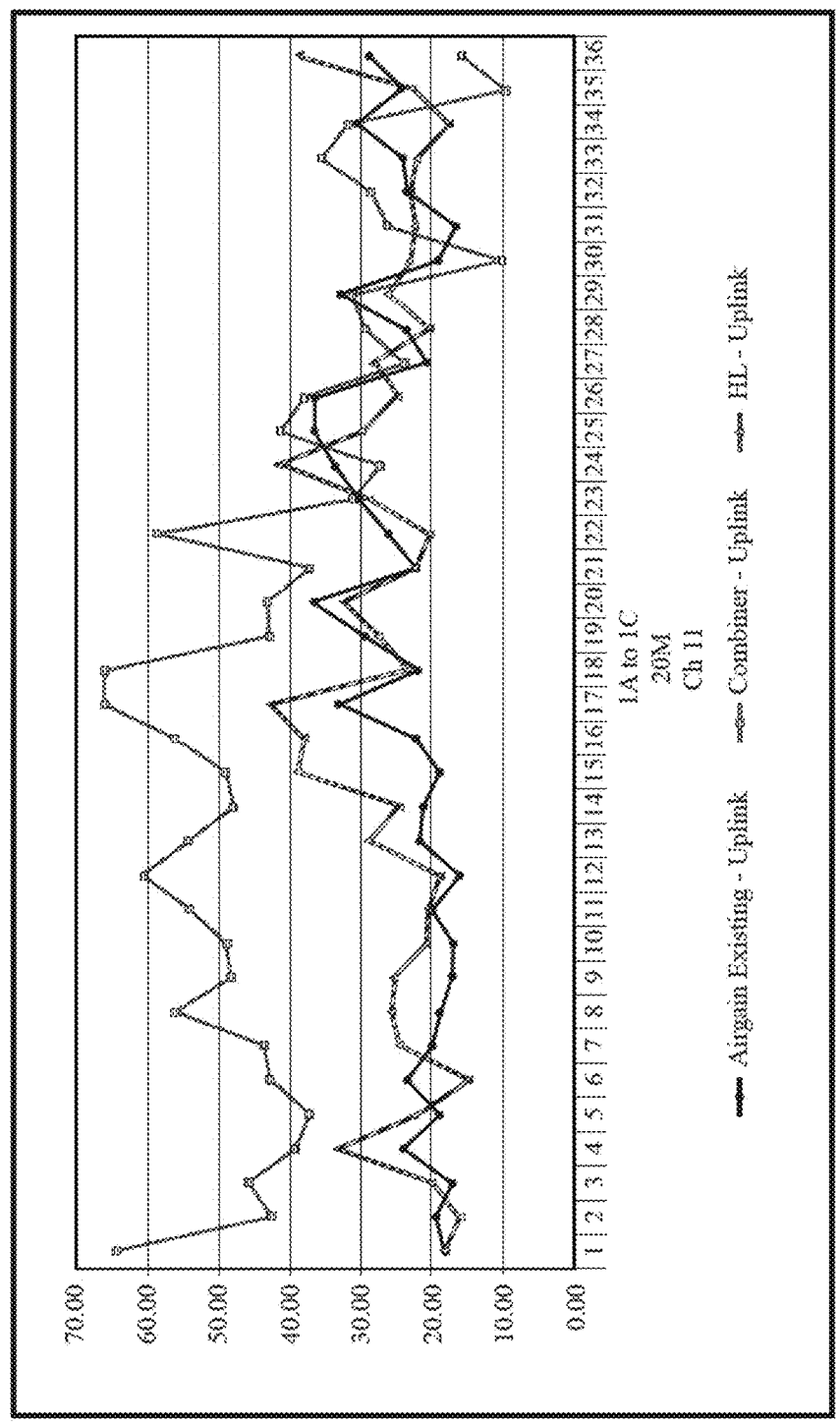
FIG. 22 is a step chart of 2.4 Ghz uplink.

FIG. 22 is a step chart of 2.4 Ghz uplink comparison for a current basic antenna system (Airgain existing), the antenna system of the present invention (combiner) and an HL antenna system.

Figure 23:
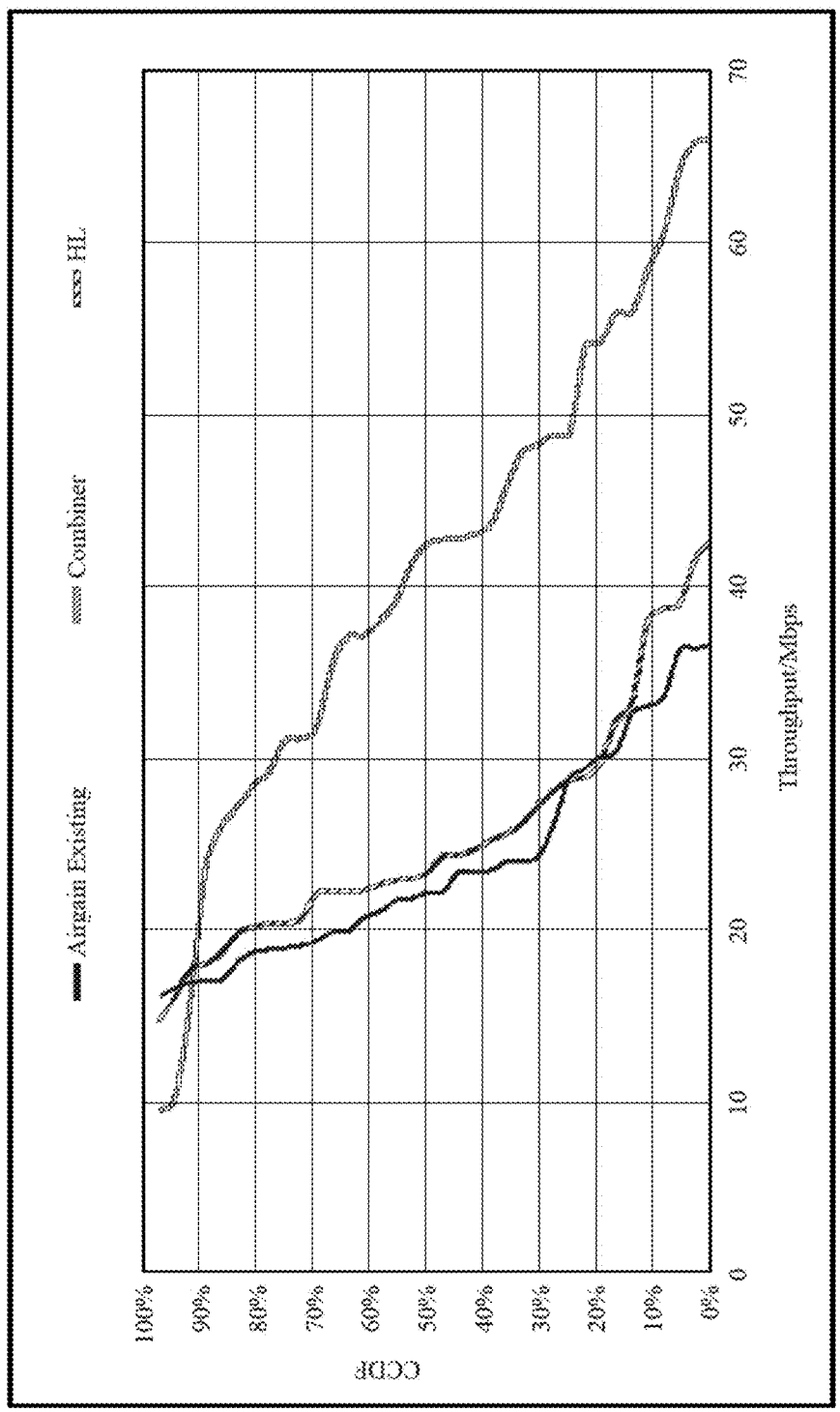
FIG. 23 is a graph of a complimentary cumulative distribution function at 2.4 GHz uplink.

FIG. 23 is a graph of a complimentary cumulative distribution function at 2.4 GHz uplink comparison for a current basic antenna system (Airgain existing), the antenna system of the present invention (combiner) and an HL antenna system.

Figure 24:
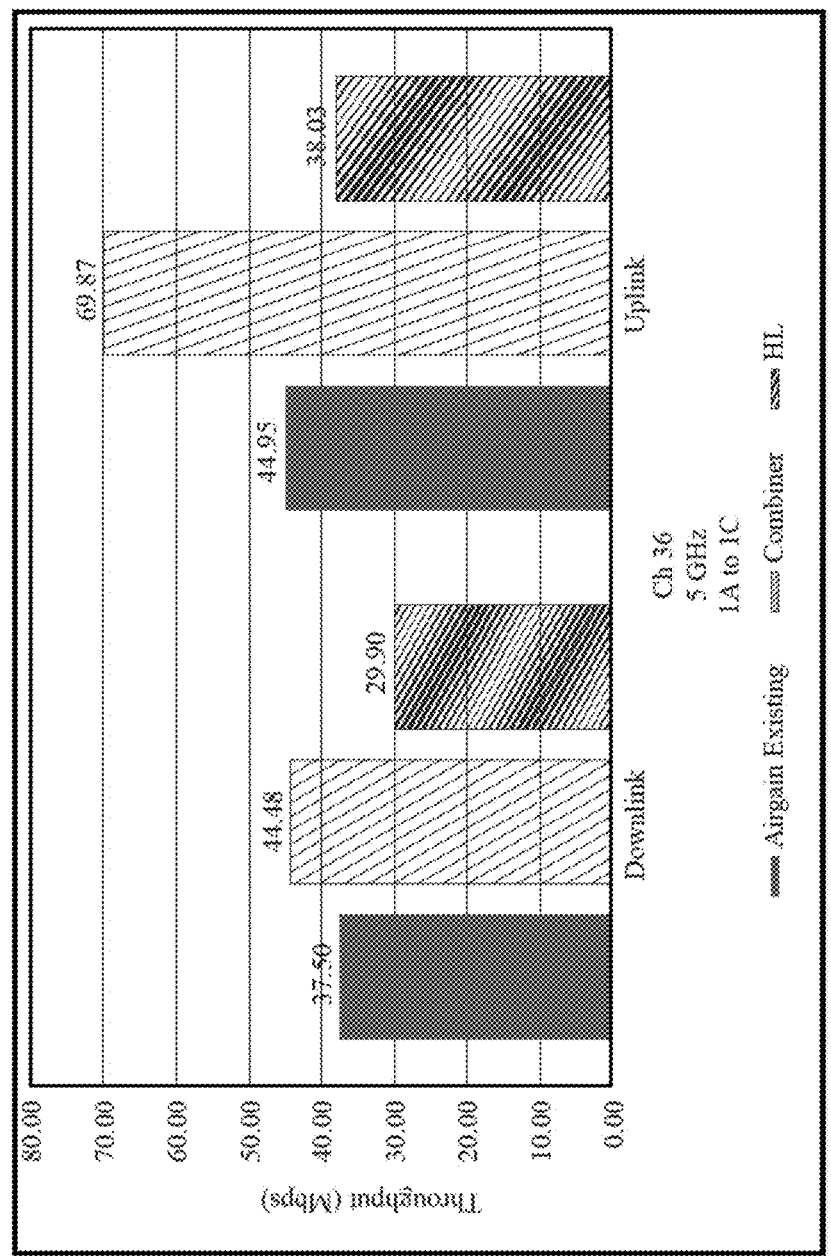
FIG. 24 is a graph of overall throughput at 5 GHz.

FIG. 24 is a graph of overall throughput at 5 GHz comparison for a current basic antenna system (Airgain existing), the antenna system of the present invention (combiner) and an HL antenna system.

Figure 25:
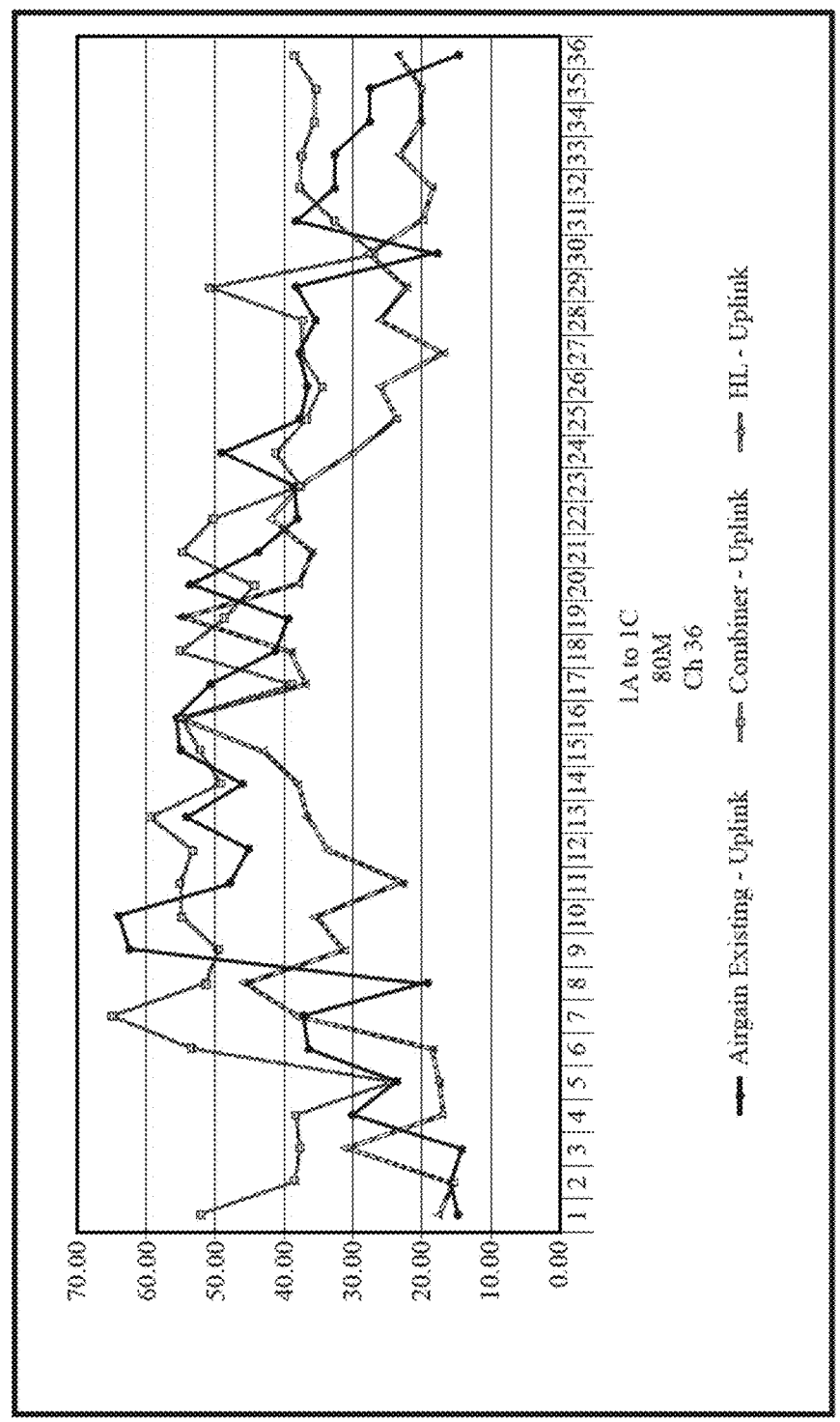
FIG. 25 is a step chart of 5 Ghz downlink.

FIG. 25 is a step chart of 5 Ghz uplink comparison for a current basic antenna system (Airgain existing), the antenna system of the present invention (combiner) and an HL antenna system.

Figure 26:
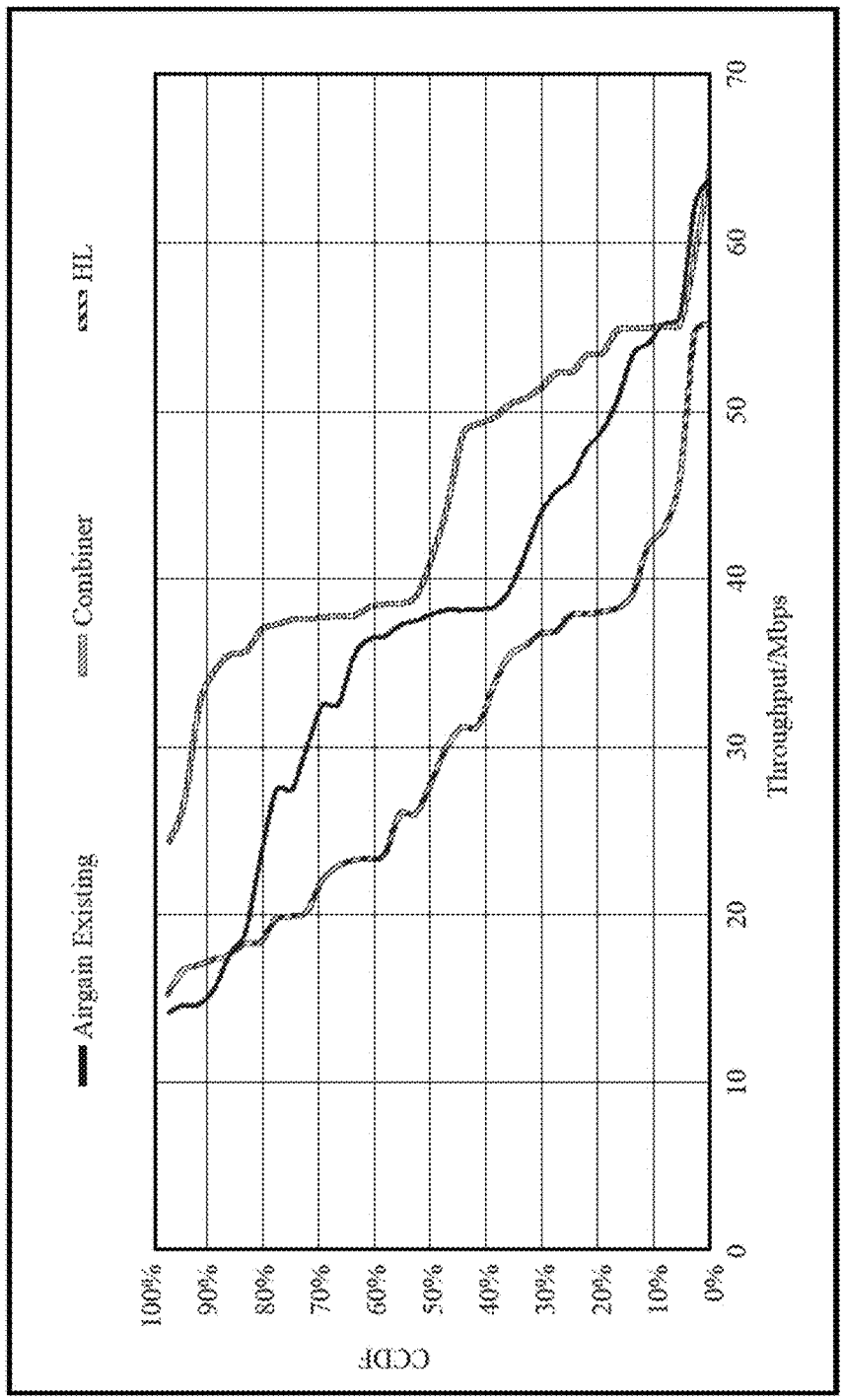
FIG. 26 is a graph of a complimentary cumulative distribution function at 5 GHz downlink.

FIG. 26 is a graph of a complimentary cumulative distribution function at 5 GHz uplink comparison for a current basic antenna system (Airgain existing), the antenna system of the present invention (combiner) and an HL antenna system.

Figure 27:
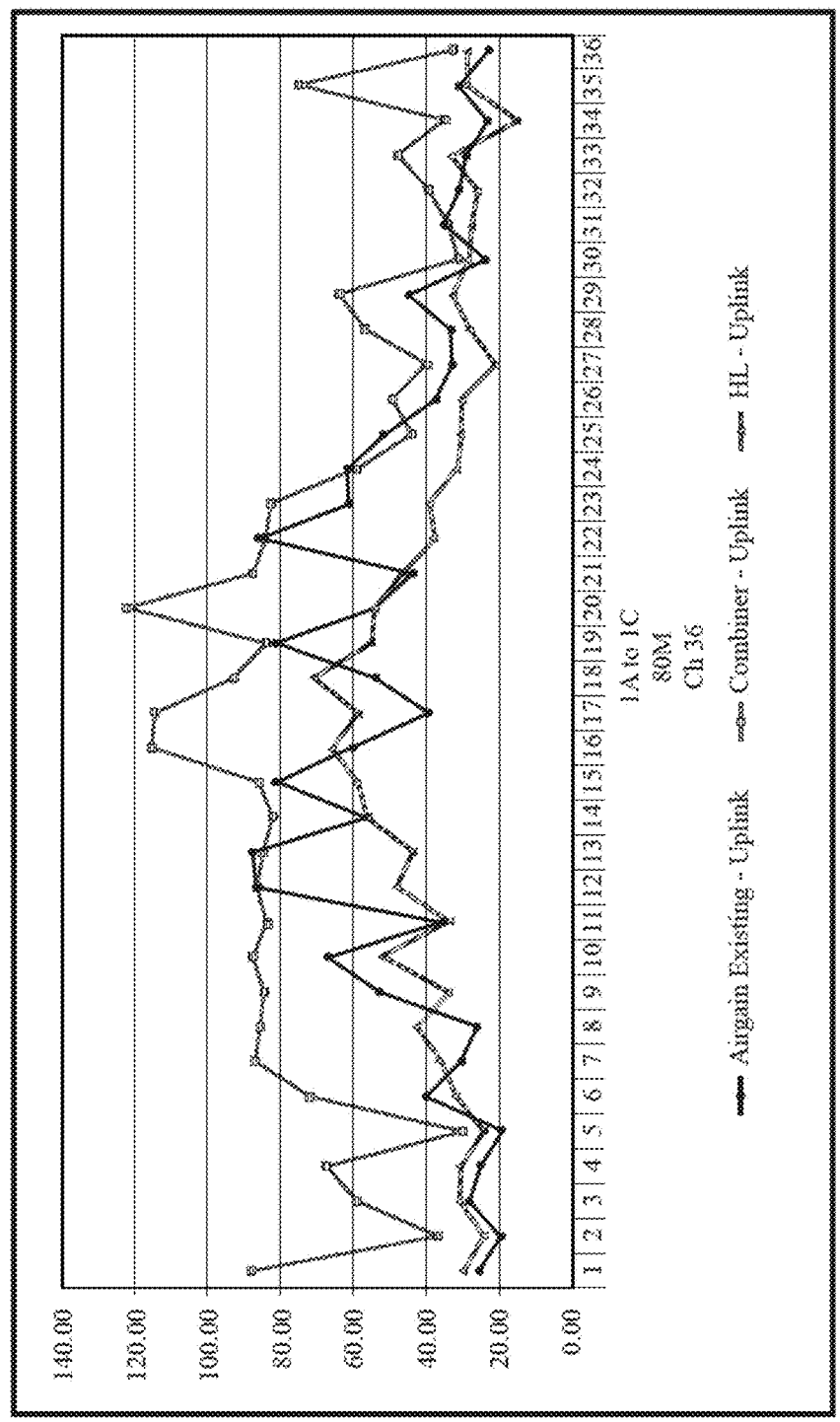
FIG. 27 is a step chart of 5 Ghz uplink.

FIG. 27 is a step chart of 5 Ghz uplink comparison for a current basic antenna system (Airgain existing), the antenna system of the present invention (combiner) and an HL antenna system.

Figure 28:
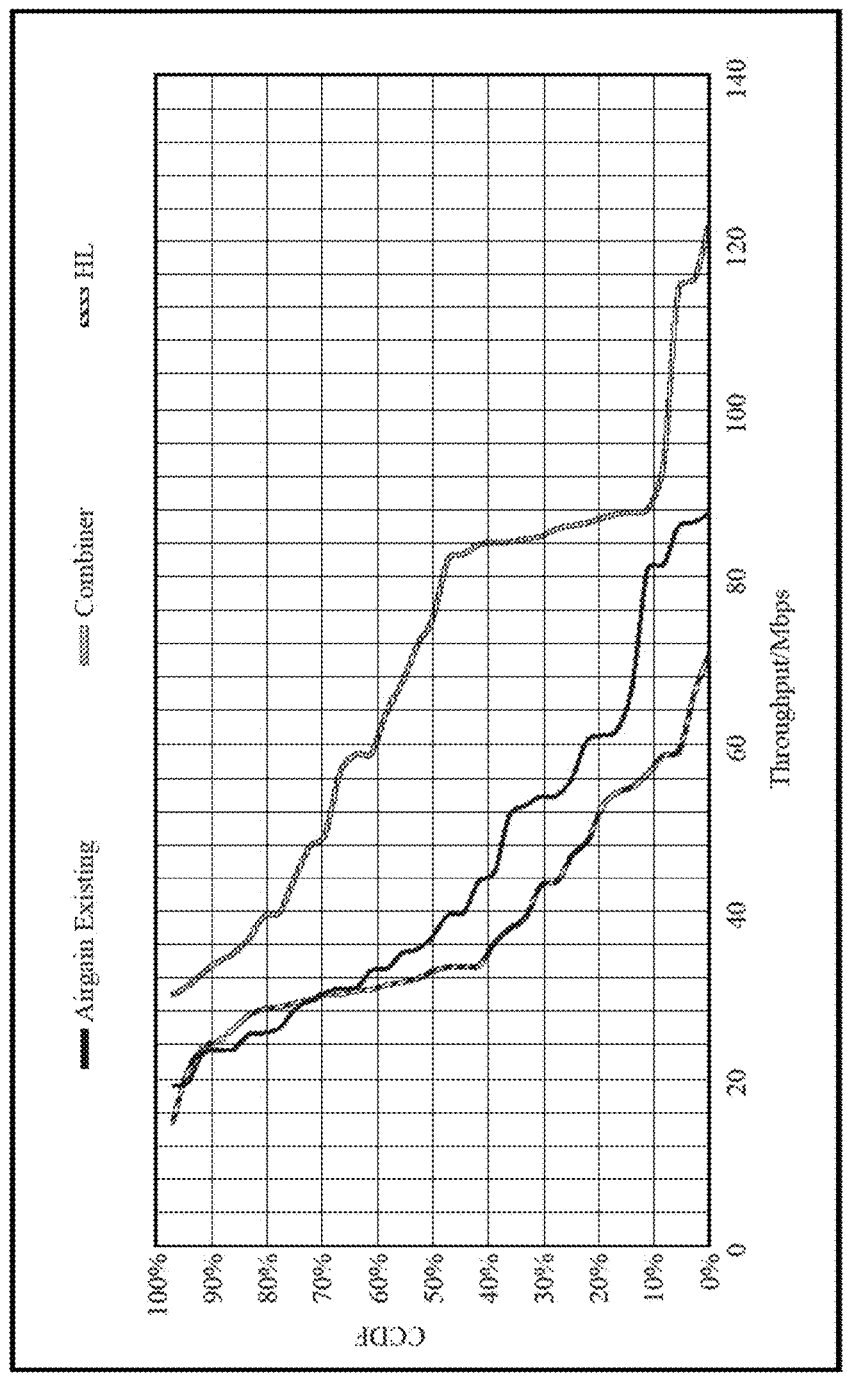
FIG. 28 is a graph of a complimentary cumulative distribution function at 5 GHz uplink.

FIG. 28 is a graph of a complimentary cumulative distribution function at 5 GHz uplink comparison for a current basic antenna system (Airgain existing), the antenna system of the present invention (combiner) and an HL antenna system.

He, U.S. Pat. No. 9,362,621 for a Multi-Band LTE Antenna is hereby incorporated by reference in its entirety.

Abramov et al., U.S. Pat. No. 7,215,296 for a Switch Multi-Beam Antenna Serial is hereby incorporated by reference in its entirety.

Salo et al., U.S. Pat. No. 7,907,971 for an Optimized Directional Antenna System is hereby incorporated by reference in its entirety.

Abramov et al., U.S. Pat. No. 7,570,215 for an Antenna device with a controlled directional pattern and a planar directional antenna is hereby incorporated by reference in its entirety.

Abramov et al., U.S. Pat. No. 7,570,215 for an Antenna device with a controlled directional pattern and a planar directional antenna is hereby incorporated by reference in its entirety.

Abramov et al., U.S. Pat. No. 8,423,084 for a Method for radio communication in a wireless local area network and transceiving device is hereby incorporated by reference in its entirety.

Khitrik et al., U.S. Pat. No. 7,336,959 for an Information transmission method for a wireless local network is hereby incorporated by reference in its entirety.

Khitrik et al., U.S. Pat. No. 7,043,252 for an Information transmission method for a wireless local network is hereby incorporated by reference in its entirety.

Abramov et al., U.S. Pat. No. 8,184,601 for a METHOD FOR RADIO COMMUNICATION INA WIRELESS LOCAL AREA NETWORK WIRELESS LOCAL AREA NETWORK AND TRANSCEIVING DEVICE is hereby incorporated by reference in its entirety.

Abramov et al., U.S. Pat. No. 7,627,300 for a Dynamically optimized smart antenna system is hereby incorporated by reference in its entirety.

Abramov et al., U.S. Pat. No. 6,486,832 for a Direction-agile antenna system for wireless communications is hereby incorporated by reference in its entirety.

Yang, U.S. Pat. No. 8,081,123 for a COMPACT MULTI-LEVEL ANTENNA WITH PHASE SHIFT is hereby incorporated by reference in its entirety.

Nagaev et al., U.S. Pat. No. 7,292,201 for a Directional antenna system with multi-use elements is hereby incorporated by reference in its entirety.

Abramov et al., U.S. Pat. No. 7,696,948 for a Configurable directional antenna is hereby incorporated by reference in its entirety.

Abramov et al., U.S. Pat. No. 7,965,242 for a Dual-band antenna is hereby incorporated by reference in its entirety.

Abramov et al., U.S. Pat. No. 7,729,662 for a Radio communication method in a wireless local network is hereby incorporated by reference in its entirety.

Abramov et al., U.S. Pat. No. 8,248,970 for an OPTIMIZED DIRECTIONAL MIMO ANTENNA SYSTEM is hereby incorporated by reference in its entirety.

Visuri et al., U.S. Pat. No. 8,175,036 for a MULTIMEDIA WIRELESS DISTRIBUTION SYSTEMS AND METHODS is hereby incorporated by reference in its entirety.

Yang, U.S. Patent Publication Number 20110235755 for an MIMO Radio System With Antenna Signal Combiner is hereby incorporated by reference in its entirety.

Yang et al., U.S. Pat. No. 9,013,355 for an L SHAPED FEED AS PART OF A MATCHING NETWORK FOR A MICROSTRIP ANTENNA is hereby incorporated by reference in its entirety.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

I claim as my invention:

1. An antenna system for an appliance, the antenna system comprising:

the appliance having a front surface and a rear surface;

a printed circuit board (PCB) having a first antenna and a second antenna, the PCB centrally mounted on the rear surface;

a combiner having a shield case and in communication with the first antenna and the second antenna;

a radio;

a processor; and a wireless access point positioned forward of the display surface of the large television and operating on an 802.11 communication protocol;

wherein the combiner is a passive switch that uses the strongest signal of the first antenna and the second antenna, and a difference between the signal from the wireless access point received at the first antenna and the second antenna ranged from 6 dB to 10 dB;

wherein the appliance has a surface area of at least nine feet and is a 4K high definition television;

wherein the appliance comprises a metal surface that blocks antenna signals from the wireless access point.

2. The antenna system according to claim 1 wherein the first antenna and the second antenna are separated by 30 mm.

3. The antenna system according to claim 1 wherein the large appliance has a surface area of at least five times the wavelength of the antenna signal.

4. The antenna system according to claim 1 wherein the antenna system is a MIMO antenna system.

5. The antenna system according to claim 1 wherein the antenna system is a MIMO antenna system with a 2×2 dual band antenna and further comprises a single BLUETOOTH antenna and a 5G antenna.

6. The antenna system according to claim 1 wherein the antenna system is a MIMO antenna system with a 3×3 antenna on 802.11ac and 3×3 antenna on 802.11n.

* * * * *